US009643796B2

(12) United States Patent
Koga et al.

(10) Patent No.: US 9,643,796 B2
(45) Date of Patent: May 9, 2017

(54) DEVICE AND METHOD OF ARRAYING ARTICLES BY USING ROBOT, AND ARTICLE TRANSFER SYSTEM

(71) Applicant: FANUC CORPORATION, Yamanashi (JP)

(72) Inventors: Kentarou Koga, Yamanashi (JP); Masafumi Ooba, Yamanashi (JP); Ichiro Kanno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 136 days.

(21) Appl. No.: 14/632,166

(22) Filed: Feb. 26, 2015

(65) Prior Publication Data

US 2015/0246778 A1    Sep. 3, 2015

(30) Foreign Application Priority Data

Feb. 28, 2014  (JP) .................................. 2014-039910
Apr. 25, 2014  (JP) .................................. 2014-091756

(51) Int. Cl.
*G06F 7/00*    (2006.01)
*B65G 47/90*   (2006.01)
*B25J 9/16*    (2006.01)
*G05B 19/418*  (2006.01)

(52) U.S. Cl.
CPC .......... *B65G 47/905* (2013.01); *B25J 9/1697* (2013.01); *G05B 19/4182* (2013.01); *Y02P 90/083* (2015.11)

(58) Field of Classification Search
USPC ........................................................ 700/218
See application file for complete search history.

(56) References Cited

U.S. PATENT DOCUMENTS 5,040,056 A *  8/1991  Sager .................... B25J 9/0093
                                                  348/88
6,374,984 B1 *  4/2002  Nagler ................... B07C 5/361
                                                   177/1

(Continued)

FOREIGN PATENT DOCUMENTS

CN    101314225 A    12/2008
CN    102837318 A    12/2012

(Continued)

OTHER PUBLICATIONS

English Translation of German Publication No. 102010022357, published Dec. 9, 2010, 16 pages.

(Continued)

*Primary Examiner* — Kyle Logan
(74) *Attorney, Agent, or Firm* — Fredrikson & Byron, P.A.

(57) ABSTRACT

An article arraying device including a robot; a vision sensor for obtaining position information of each of randomly arranged articles; an arrangement pattern generating section for generating an arrangement pattern by using the position information, the arrangement pattern including pattern elements in a regular arrangement, in such a manner that any one of the pattern elements coincides with a position of a reference article in the randomly arranged articles; a picking motion generating section for generating a picking motion by using the position information, the robot picking up by the picking motion an article other than the reference article; an arraying motion generating section for generating an arraying motion, the robot placing by the arraying motion the picked-up article in a position juxtaposed to the reference article in accordance with the arrangement pattern; and a robot controlling section for controlling the picking motion and the arraying motion.

15 Claims, 27 Drawing Sheets

(56) References Cited

U.S. PATENT DOCUMENTS

| | | | |
|---|---|---|---|
| 6,779,647 B1 | 8/2004 | Nagler | |
| 2006/0149421 A1* | 7/2006 | Akiyama | B25J 9/1664 700/245 |
| 2007/0282485 A1* | 12/2007 | Nagatsuka | B25J 9/1671 700/245 |

FOREIGN PATENT DOCUMENTS

| | | |
|---|---|---|
| DE | 102006003859 B3 | 3/2007 |
| DE | 102010022357 A1 | 12/2010 |
| JP | H08336783 A | 12/1996 |
| JP | H09290392 A | 11/1997 |
| JP | 2002316716 A | 10/2002 |
| JP | 20106590 A | 1/2010 |
| JP | 2010064202 A | 3/2010 |
| JP | 2012230041 A | 11/2012 |
| JP | 2013000860 A | 1/2013 |
| JP | 2013000861 A | 1/2013 |
| JP | 2013158845 A | 8/2013 |
| JP | 5288908 B2 | 9/2013 |
| WO | 2010034044 A2 | 4/2010 |
| WO | 2010041371 A1 | 4/2010 |

OTHER PUBLICATIONS

English Translation of German Publication No. 102006003859, published Mar. 1, 2007, 6 pages.

English Translation of WO Publication No. 2010034044, published Apr. 1, 2010, 18 pages.

English Translation of Japanese Publication No. 2002316716, published Oct. 31, 2002, 8 pages.

English Translation of Japanese Publication No. H09290392, published Nov. 11, 1997, 18 pages.

English Translation of Japanese Publication No. H08336783, published Dec. 24, 1996, 11 pages.

English Abstract for Chinese Publication No. 101314225 A, published Dec. 3, 2008, 1 pg.

English Abstract for Chinese Publication No. 102837318 A, published Dec. 26, 2012, 1 pg.

English abstract for Japanese Publication No. JP 2013-000860 A, published Jan. 7, 2013, 1 pg.

English abstract for Japanese Publication No. JP 2013-000861 A, published Jan. 7, 2013, 1 pg.

English abstract for Japanese Publication No. JP 5288908 B2, published Sep. 11, 2013, 2 pgs.

English Translation of Abstract for Japanese Publication No. 2013158845, published Aug. 19, 2013, 1 page.

English Translation of Abstract for Japanese Publication No. 2012230041, published Nov. 22, 2012, 1 page.

English Translation of Abstract for Japanese Publication No. 2010064202, published Mar. 25, 2010, 1 page.

English Abstract and Machine Translation for Japanese Publication No. 2010-006590 A, published Jan. 14, 2010, 20 pgs.

* cited by examiner

FIG. 2
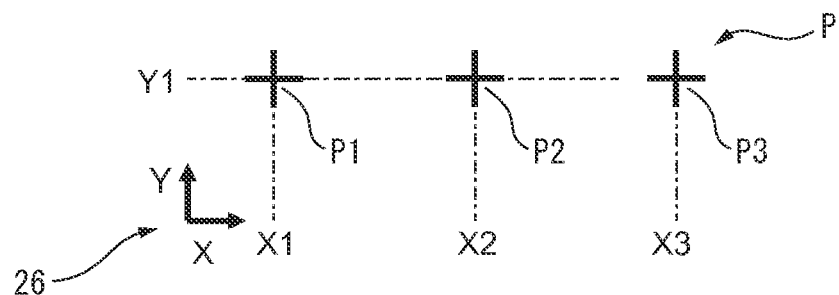
FIG. 3
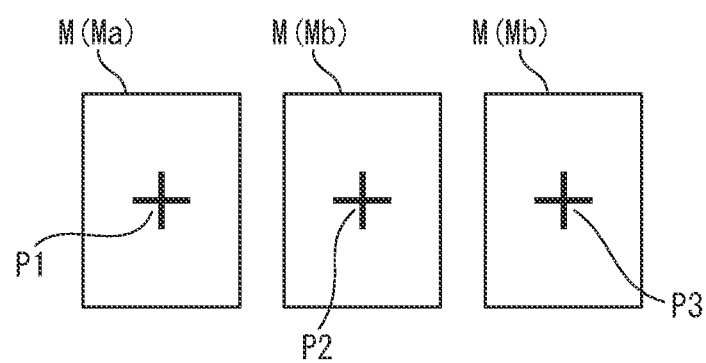
FIG. 4
|    | X  | Y  | R |
|----|----|----|---|
| P1 | X1 | Y1 | 0 |
| P2 | X2 | Y1 | 0 |
| P3 | X3 | Y1 | 0 |

FIG. 5A
|    | X  | Y  | R   |
|----|----|----|-----|
| P1 | X1 | Y1 | 0   |
| P2 | X2 | Y1 | -90 |
| P3 | X2 | Y2 | 180 |
| P4 | X1 | Y2 | 90  |
FIG. 5B
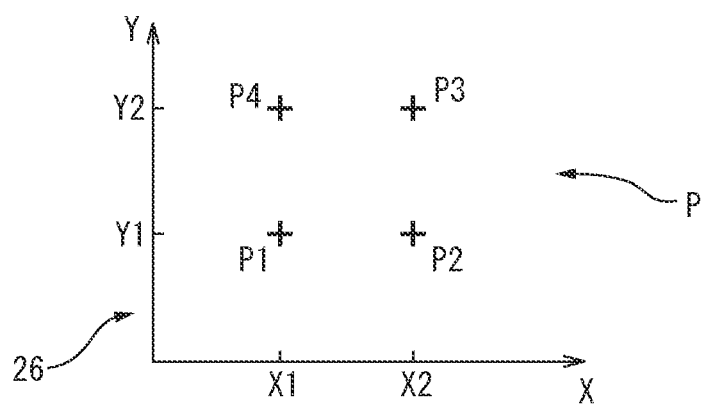
FIG. 5C
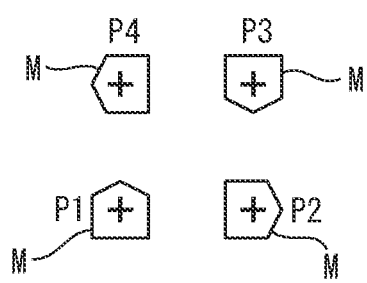

|    | X | Y | R    |
|----|---|---|------|
| P1 | 0 | 0 | 0    |
| P2 | 0 | 0 | -60  |
| P3 | 0 | 0 | -120 |
| P4 | 0 | 0 | 180  |
| P5 | 0 | 0 | 120  |
| P6 | 0 | 0 | 60   |

FIG. 29A
|    | X | Y | Z  | R |
|----|---|---|----|---|
| P1 | 0 | 0 | 0  | 0 |
| P2 | 0 | 0 | Z1 | 0 |
| P3 | 0 | 0 | Z2 | 0 |
FIG. 29B
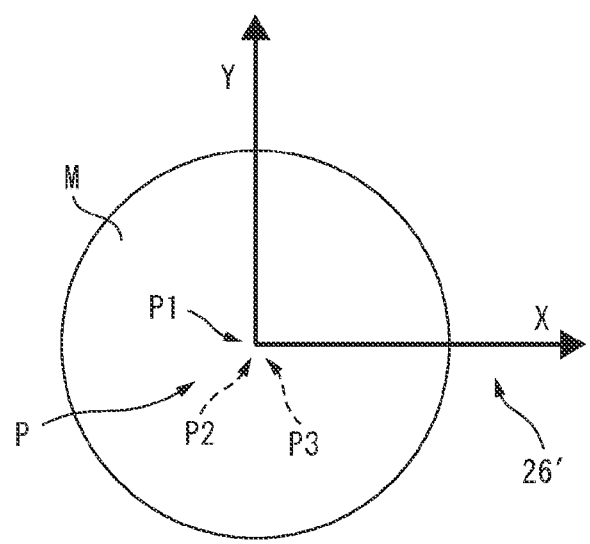
FIG. 29C
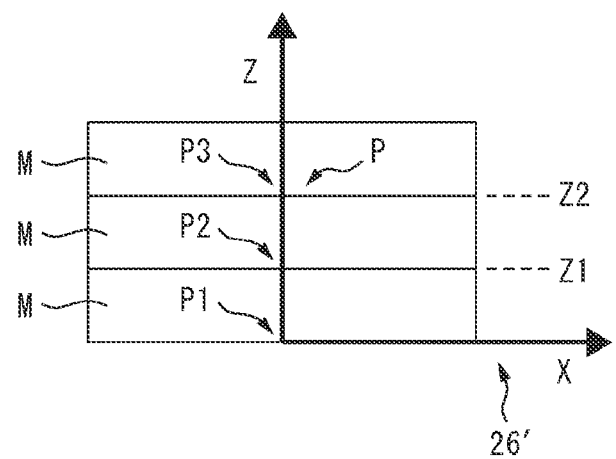

DEVICE AND METHOD OF ARRAYING ARTICLES BY USING ROBOT, AND ARTICLE TRANSFER SYSTEM

BACKGROUND OF THE INVENTION

1. Field of the Invention

The present invention relates to a device and a method of arraying articles by using a robot. The present invention also relates to an article transfer system that includes an article arraying device.

2. Description of the Related Art

A system in which a vision sensor detects a plurality of articles placed in a random arrangement and a robot picks up individual articles based on position information of the detected articles and transfers the articles to another place, has been known.

Japanese Unexamined Patent Publication No. 2013-000860 (JP2013-000860A), for example, discloses a picking system in which a plurality of robots pick up a plurality of respective workpieces conveyed by a conveyor in a random arrangement. In this picking system, an image area of a camera is divided into a plurality of areas and a transfer motion for a workpiece in each of the areas is executed by a robot associated in advance with the corresponding area. Japanese Unexamined Patent Publication No. 2013-000861 (JP2013-000861A) discloses another picking system in which a plurality of robots pick up a plurality of respective workpieces conveyed by a conveyor in a random arrangement. In this picking system, directions of individual workpieces in an image captured by a camera are determined to belong to which of a plurality of predetermined angle ranges and a transfer motion for each workpiece is executed by a robot associated in advance with the corresponding angle range.

Japanese Letters Patent No. 5288908 (JP5288908B) discloses an article arraying system for arraying a plurality of articles supplied in a random arrangement with a plurality of robots so as to rearrange the articles to a regular arrangement in which articles have the same orientation and mutually corresponding surfaces thereof face in the same direction. JP5288908B recites a robot gripper that has a characteristic configuration applicable to the article arraying system.

SUMMARY OF THE INVENTION

In the technique in which a robot picks up a plurality of articles placed in a random arrangement and transfers the articles to another place, it is desired to improve working efficiency in transferring the articles to another place so as to maintain a regular arrangement in which the articles are juxtaposed to each other. In the technique in which a robot arrays a plurality of articles so as to rearrange the articles from a random arrangement to a regular arrangement, it is desired to improve working efficiency in arraying the articles and to allow a general-purpose robot to be used.

One aspect of the present invention provides an article arraying device configured to array a plurality of articles so as to rearrange the articles from a random arrangement to a regular arrangement, comprising a robot configured to hold an article; a vision sensor configured to obtain position information of each of a plurality of articles placed in a random arrangement; an arrangement pattern generating section configured to generate an arrangement pattern with use of the position information, the arrangement pattern including a plurality of pattern elements in a predetermined regular arrangement, each pattern element representing a position of an article, in such a manner that a first pattern element that is any one of the plurality of pattern elements coincides with a position of a reference article that is any one of the plurality of articles placed in the random arrangement; a picking motion generating section configured to generate a picking motion of the robot with use of the position information, the robot being configured to pick up, by the picking motion, an article other than the reference article; an arraying motion generating section configured to generate an arraying motion of the robot, the robot being configured to place, by the arraying motion, the article picked up by the picking motion in a position juxtaposed to the reference article in accordance with the arrangement pattern; and a robot controlling section configured to control the picking motion and the arraying motion of the robot.

In the article arraying device according to one aspect, the arrangement pattern is generated on site by considering any one of the articles placed in the random arrangement as the reference article, and the robot operates to place the other article in a position juxtaposed to the reference article in accordance with the arrangement pattern, without moving the reference article, and thereby it is possible to array the articles in the regular arrangement. Therefore, regarding an operation for rearranging a single article from the random arrangement to the regular arrangement as a unit operation, it is possible to array the articles, the number of which is one more than the number of unit operations, and thereby to improve the efficiency in the arraying operation as an assemblage of unit operations. Also, it is possible to use a general-purpose robot, as long as it can perform the picking motion and the arraying motion while holding the article. An article arraying method according to another aspect provides the same effect.

The article arraying device may further comprise an interference judging section configured to predictively judge as to whether an interference is caused between an article capable of being placed on a second pattern element in the arrangement pattern, different from the first pattern element, and another article including the reference article, with use of shape information of each of the plurality of articles together with the position information. In this configuration, the picking motion generating section may be configured to generate the picking motion in consideration of a judgment of the interference judging section; and the arraying motion generating section may be configured to generate the arraying motion in consideration of a judgment of the interference judging section.

In the configuration where the article arraying device further includes the interference judging section, the robot executes the picking motion and the arraying motion in the unit operation, in which the interference is efficiently avoidable through judging whether the interference is caused between the articles. Thus, it is possible to improve the efficiency in the arraying operation as an assemblage of the unit operations.

Another aspect of the present invention provides an article transfer system, comprising the aforementioned article arraying device; a conveying device configured to convey a plurality of articles in a regular arrangement in which the articles are juxtaposed to each other; and a transfer robot configured to collectively hold a plurality of articles arrayed in the regular arrangement by the article arraying device and to transfer the articles to the conveying device.

In the article transfer system according to the other aspect, the transfer robot can collectively hold the predetermined number of articles arrayed in the regular arrangement by the article arraying device and transfer them to the conveying device, with the regular arrangement maintained. In a system configuration where it is desired for the conveying device to convey the articles in the regular arrangement in which the articles are juxtaposed to each other, the transfer robot does not need to have a function of arraying the articles, and thereby it is possible to improve efficiency of the transferring operation. Also, it is possible to use a general-purpose transfer robot, as long as it can be provided with a gripper capable of collectively hold a predetermined number of arrayed articles.

A further aspect of the present invention provides an article arraying method for making a robot array a plurality of articles so as to rearrange the articles from a random arrangement to a regular arrangement, comprising obtaining position information of each of a plurality of articles placed in a random arrangement; generating an arrangement pattern with use of the position information, the arrangement pattern including a plurality of pattern elements in a predetermined regular arrangement, each pattern element representing a position of an article, in such a manner that a first pattern element that is any one of the plurality of pattern elements coincides with a position of a reference article that is any one of the plurality of articles placed in the random arrangement; generating a picking motion of the robot with use of the position information, the robot being configured to pick up, by the picking motion, an article other than the reference article; generating an arraying motion of the robot, the robot being configured to place, by the arraying motion, the article picked up by the picking motion in a position juxtaposed to the reference article in accordance with the arrangement pattern; and controlling the picking motion and the arraying motion of the robot, so as to array the plurality of articles including the reference article in a regular arrangement.

BRIEF DESCRIPTION OF THE DRAWINGS

The objects, features and advantages of the present invention will become more apparent from the following description of the embodiments in connection with the accompanying drawings, wherein:

FIG. 2 is a schematic illustration of one example of an arrangement pattern;

FIG. 3 is an illustration of an example of articles arrayed in accordance with an arrangement pattern;

FIG. 4 is a table depicting an example of an arrangement form defining a pattern element;

FIG. 5A depicts another example of an arrangement form;

FIG. 5B depicts another example of an arrangement pattern;

FIG. 5C depicts articles arrayed in accordance with the other example of an arrangement pattern;

FIG. 29A depicts a yet further example of an arrangement form;

FIG. 29B a top plan view of articles arrayed in accordance with a yet further example of an arrangement pattern; and FIG. 29C a side view of the articles of FIG. 29B.

DETAILED DESCRIPTION

Figure 1:
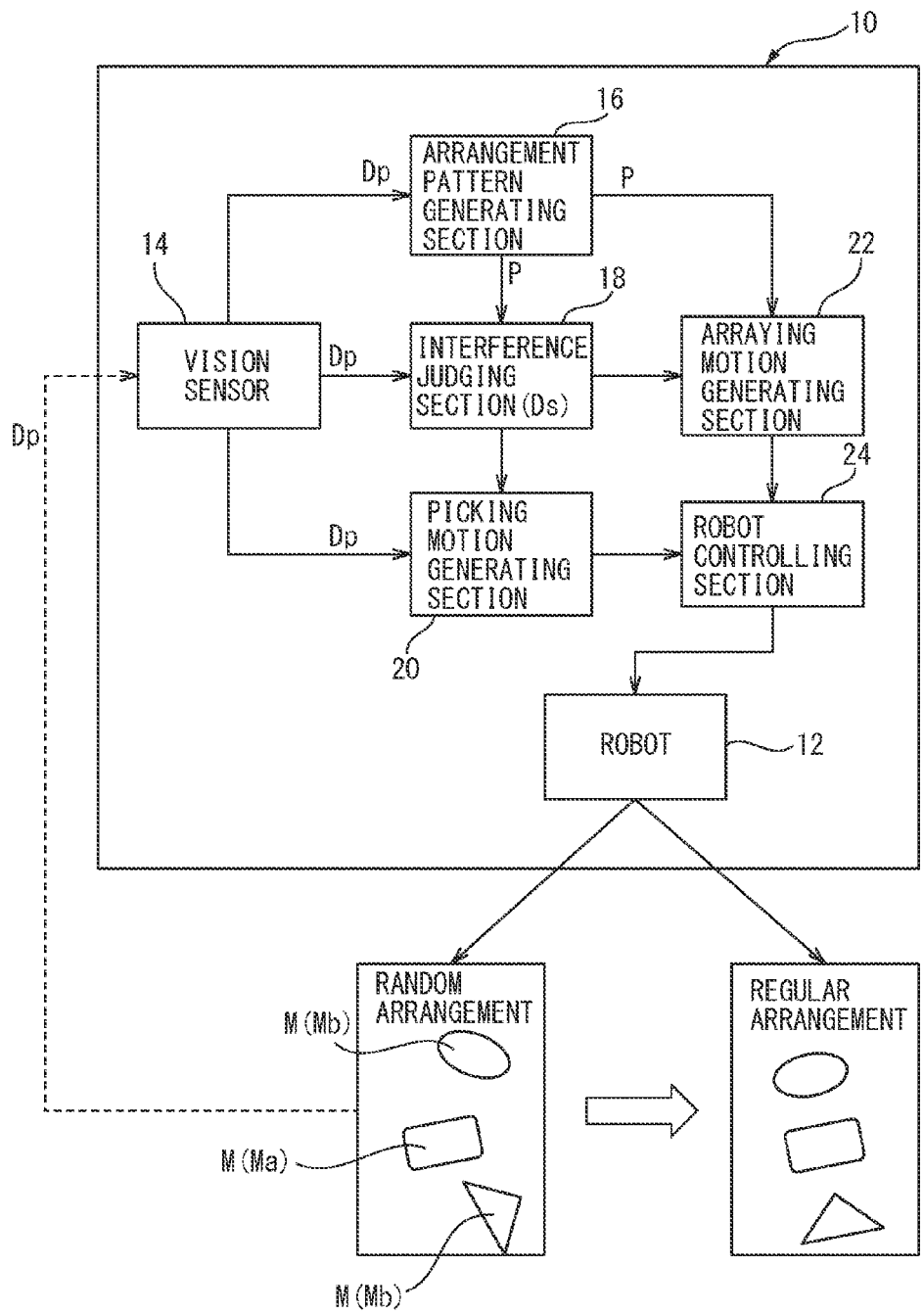
FIG. 1 is a functional block diagram illustrating a configuration of an article arraying device according to one aspect.

The embodiments of the present invention are described below, in detail, with reference to the accompanying drawings. Throughout the drawings, same or similar components are denoted by common reference numerals.

FIG. 1 is a functional block diagram illustrating a configuration of an article arraying device 10 according to one embodiment of the present invention. The article arraying device 10 is configured to array a plurality of articles M by a robot 12, so as to rearrange the articles from a random arrangement to a regular arrangement.

The article arraying device 10 includes a robot 12 configured to hold an article M; a vision sensor 14 configured to obtain position information Dp of each of a plurality of articles M placed in a random arrangement; an arrangement pattern generating section 16 configured to generate, in a virtual manner, an arrangement pattern P with use of the position information Dp, the arrangement pattern P including a plurality of pattern elements in a predetermined regular arrangement, each pattern element representing a position of an article M, in such a manner that a first pattern element that is any one of the plurality of pattern elements coincides with a position of a reference article Ma that is any one of the plurality of articles M placed in the random arrangement; an interference judging section 18 configured to predictively judge as to whether an interference is caused between an article Mb capable of being placed on a second pattern element in the arrangement pattern, different from the first pattern element, and another article M including the reference article Ma, with use of shape information Ds of each of the plurality of articles together with the position information Dp; a picking motion generating section 20 configured to generate a picking motion of the robot 12 with use of the position information Dp, in consideration of a judgment of the interference judging section 18, the robot 12 being configured to pick up, by the picking motion, an article Mb other than the reference article Ma; an arraying motion generating section 22 configured to generate an arraying motion of the robot 12, in consideration of the judgment of the interference judging section 18, the robot 12 being configured to place, by the arraying motion, the article Mb picked up by the picking motion in a position juxtaposed to the reference article Ma in accordance with the arrangement pattern P; and a robot controlling section 24 configured to control the picking motion and the arraying motion of the robot 12.

The article M may be variously shaped and dimensioned. The articles M having various shapes and sizes, or the articles M having the same shape and size, may be placed in the random arrangement. The "random arrangement" means an arrangement where the articles M are randomly arranged and not intended to be arranged in a certain form. More specifically, the random arrangement means that, in a two-dimensional extent (e.g., in an image obtained by the vision sensor 14) defined when viewing the plurality of articles M from directly above, the respective articles M take various positions and orientations. On the contrary, the "regular arrangement" achieved by the article arraying device 10 means an arrangement wherein the plurality of articles M are arranged under a predetermined rule, such as in a linear array, a curved array, a zigzag array, an annular array, etc., in the two-dimensional extent. In the regular arrangement, the orientations (or the directions) of the respective articles M may be identical to or different from each other, and the distances between the adjacent pairs of articles M may be identical to or different from each other.

The robot 12 may include a mechanical section appropriately selected from various known mechanical sections, such as an articulated type, a gantry type, a parallel link type, etc. As described later, the robot 12 may not have a configuration dedicated for an article arraying operation performed by the article arraying device 10, but the robot 12 and an end effector, such as a gripper, may have a versatile configuration.

The vision sensor 14 includes an image capturing section such as a CCD camera, and an image processing section such as a dedicated image processor or one function of a control device described later. The image capturing section captures an image of the plurality of articles M placed in the random arrangement in a viewing field of the image capturing section from directly above (i.e., in a plan view), and the image processing section performs appropriate image processing on the captured image data, so that the vision sensor 14 detects the existence of the article M and obtains information of position (coordinate value) and orientation (rotational angle) of each article M in a predetermined two-dimensional camera coordinate system. The position information Dp obtained by the vision sensor 14 includes the information of the position and the orientation of the article M. However, the position information Dp may not include the information of the orientation of the article M, in a configuration where, for example, a suction gripper that does not limit a holing position of the article M is attached to the robot 12, and the plurality of articles M arrayed in the regular arrangement take various orientations. The vision sensor 14 may further obtain information of a two-dimensional outer shape of each article M (i.e., shape information Ds) from the image data. The position information Dp and shape information Ds, obtained by the vision sensor 14, may be displayed as images on a monitor (not shown).

The arrangement pattern generating section 16, the interference judging section 18, the picking motion generating section 20, the arraying motion generating section 22, and the robot controlling section 24 are configured respectively as functional components of a control device described later. The functions of the respective sections will be described in more detail in later-described embodiments.

FIG. 2 schematically illustrates one example of the arrangement pattern P generated by the arrangement pattern generating section 16. The arrangement pattern P of the illustrated example includes a plurality of (three) pattern elements P1, P2 and P3, each representing a position of the article M, in a predetermined regular arrangement (in the drawing, linearly arrayed in a lateral direction). Each of the pattern elements P1, P2 and P3 is illustrated by a "+" mark for the sake of easier understanding, but does not need to have any shape. The arrangement pattern P may include two, four or more pattern elements, and may include pattern elements arrayed according to other rules, such as a curved array, a zigzag array, or an annular array.

The arrangement pattern generating section 16 is able to generate the arrangement pattern P based on an arrangement form, the arrangement form being configured to define each of the plurality of pattern elements by a coordinate value in a predetermined pattern coordinate system. In the example in FIG. 2, an arrangement form that defines the pattern elements P1, P2 and P3 by a coordinate values (X1, Y1), (X2, Y1) and (X3, Y1), respectively, is provided in a pattern coordinate system 26 set at a certain position in the camera coordinate system. Based on the arrangement form, the arrangement pattern generating section 16 virtually generates the arrangement pattern P, including the linearly-arrayed pattern elements P1, P2 and P3, on the site where the plurality of articles M are to be arrayed in a regular arrangement. The robot 12 operates in accordance with the generated arrangement pattern P so as to rearrange the plurality of articles M from the random arrangement to the regular arrangement in which the articles are linearly arrayed. In the article arraying device 10, any one of the plurality of articles M placed in the random arrangement is set as the reference article Ma (FIG. 1), and the robot 12 operates so as not to move the reference article Ma but to place the other article Mb (FIG. 1) in a position juxtaposed to the reference article Ma.

FIG. 3 illustrates an example of the articles M arrayed in the regular arrangement in accordance with the arrangement pattern P in FIG. 2. In this example, three articles M having the same rectangular two-dimensional shape are arranged with the geometrical centers thereof being positioned at three pattern elements P1, P2 and P3 of the arrangement pattern P. In the article arraying device 10, the reference article Ma is first selected from the plurality of articles M placed in the random arrangement, and a first pattern element (the leftmost pattern element P1, in the drawing) that is one of the plurality of pattern elements defined by the arrangement form (FIG. 2) is set to coincide with the position of the reference article Ma, so that the other second pattern elements (the center and rightmost pattern elements P2 and P3, in the drawing) defined by the arrangement form are linearly arrayed with respect to the first pattern element (P1), and thereby the arrangement pattern P is generated. The robot 12 places the other articles Mb so as to coincide with the second pattern elements (P2 and P3), in accordance with the arrangement pattern P. In this manner, the three articles M are arrayed in the regular arrangement in accordance with the arrangement pattern P.

In the example in FIG. 3, the articles M are arrayed by positioning or aligning the geometrical center of the two-dimensional shape of each of the articles M (Ma, Mb) at each of the pattern elements P1, P2 and P3. Alternatively, the articles M may be arrayed by positioning or aligning any other portion than the geometrical center (e.g., one apex of the rectangle) at the pattern element, provided that the portion of one article M corresponds to that of the other article M in view of the shape of the articles M. For example, an operator may set a portion of the article M, which is to be positioned at a pattern element, and provide it to the arraying motion generating section 22 (i.e., input the set portion to the control device described later).

In a configuration where the orientation of each article M is not considered when the articles M are arrayed in the regular arrangement, it is appropriate that the pattern elements P1, P2 and P3 of the arrangement pattern P represent only the positions of the articles M as described above. On the other hand, in a configuration where the orientation of each article M is considered when the articles M are arrayed in the regular arrangement, each of the pattern elements P1, P2 and P3 of the arrangement pattern P represents both the position and orientation of the article M. In this case, the arrangement form is provided to define each of the pattern elements P1, P2 and P3 by the coordinate value (X, Y) and a relative rotation angle R in the pattern coordinate system 26.

FIG. 4 shows a table depicting an example of the arrangement form defining the pattern elements P1, P2 and P3 in FIG. 2. In the arrangement form of FIG. 4, each of the pattern elements P1, P2 and P3 is defined by a coordinate value (X, Y) (i.e., (X1, Y1), (X2, Y1) and (X3, Y1)) and a relative rotation angle R (i.e., 0°, 0° and 0°). As for the relative rotation angle R, the angles of the pattern elements P2 and P3 are defined relative to the reference angle (i.e., 0°) of the pattern element P1. The arrangement pattern P including the pattern elements P1, P2 and P3 defined by the above arrangement form is used to make the robot 12 operate to array the three articles M in a linear arrangement (in the X-axis direction of the pattern coordinate system 26) with a common orientation in which the articles face the direction of 0° (e.g., in a positive direction in the Y-axis of the pattern coordinate system 26) (see FIG. 3). For example, an operator may provide the coordinate value (X, Y) and the relative rotation angle R, that define each pattern element P1, P2 and P3, to the arrangement pattern generating section 16 (i.e., input them to the control device described later), in accordance with the array configuration of the articles M to be achieved.

Other exemplary arrangement patterns P are described with reference to FIGS. 5A to 6B.

The arrangement pattern P illustrated in FIGS. 5A-5C has a configuration to make the robot 12 operate to array four articles M in a matrix form so as to take the orientations rotating 90° with respect to each other. As illustrated in FIG. 5A, the arrangement form used for generating the arrangement pattern P has a configuration wherein, in the pattern coordinate system 26, pattern elements P1, P2, P3 and P4 are respectively defined by coordinate values (X1, Y1), (X2, Y1), (X2, Y2) and (X1, Y2), and the relative rotation angles R (°) in which the pattern elements P2, P3 and P4 are respectively defined by -90°, 180° and 90° relative to the reference angle 0° of the pattern element P1. FIG. 5B illustrates the arrangement pattern P including the pattern elements P1, P2, P3 and P4 defined as described above, together with the coordinate axes of the pattern coordinate system 26. The robot 12 operates to rearrange the four articles M placed in the random arrangement to the regular arrangement, in accordance with the arrangement pattern P of FIG. 5B, in which the articles M are arrayed in the matrix form with the orientations rotating 90° with respect to each other, as illustrated in FIG. 5C. In the illustrated example, the four articles M are placed in the regular arrangement by positioning or aligning the geometric centers in the two-dimensional outer shapes of the articles M at the pattern elements P1, P2, P3 and P4.

Figures 6A, 6B:
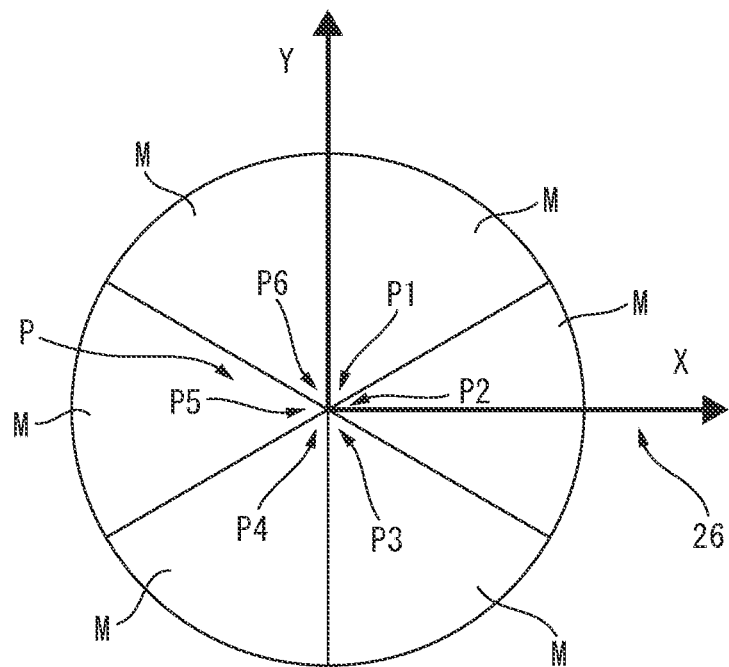
FIG. 6A depicts a further example of an arrangement form.
FIG. 6B depicts articles arrayed in accordance with a further example of an arrangement pattern.

The arrangement pattern P illustrated in FIGS. 6A-6B has a configuration to make the robot 12 operate to array six articles M in an annular form so as to take the orientations rotating 60° with respect to each other. As illustrated in FIG. 6A, the arrangement form used for generating the arrangement pattern P has a configuration wherein, in the pattern coordinate system 26, pattern elements P1, P2, P3, P4, P5 and P6 are respectively defined by coordinate values (0, 0), (0, 0), (0, 0), (0, 0), (0, 0) and (0, 0), and the relative rotation angles R (°) in which the pattern elements P2, P3, P4, P5 and P6 are respectively defined by -60°, -120°, 180°, 120° and 60° relative to the reference angle 0° of the pattern element P1. FIG. 6B illustrates the arrangement pattern P including the pattern elements P1, P2, P3, P4, P5 and P6 defined as described above, together with the coordinate axes of the pattern coordinate system 26. In this example, all of the pattern elements P1, P2, P3, P4, P5 and P6 are depicted at the origin of the pattern coordinate system 26. The robot 12 operates to rearrange the six articles M placed in the random arrangement to the regular arrangement, in accordance with the arrangement pattern P of FIG. 6B, in which the articles M are arrayed in the annular form with the orientations rotating 60° with respect to each other, as illustrated in FIG. 6B. In the illustrated example, the six articles M are placed in the regular arrangement by positioning or aligning the apexes of the two-dimensional outer shapes (or sectors) of the articles M at the pattern elements P1, P2, P3, P4, P5 and P6.

In the examples illustrated in FIGS. 5A to 6B, a first pattern element that is any one of the plurality of pattern elements defined by the arrangement form is set to coincide with the position (or the position and orientation, in a case where the relative rotation angle R of the pattern element is designated) of the reference article Ma that is any one of the plurality of articles M placed in the random arrangement, so that the other second pattern elements defined by the arrangement form are arrayed in the regular arrangement (i.e., the matrix or annular form) with respect to the first pattern element, and thereby the arrangement pattern P is generated. The robot 12 places the other articles Mb so as to coincide with the second pattern elements, in accordance with the arrangement pattern P. In this manner, the plurality of articles M are arrayed in the regular arrangement (i.e., the matrix or annular form) in accordance with the arrangement pattern P.

The pattern coordinate system 26 used in the arrangement form may be set at any position and in any orientation. The actual coordinate value (X, Y) and the relative rotation angle R, defining each pattern element, are defined correspondingly to the position and orientation of the pattern coordinate system 26. In the article arraying device 10, the arrangement pattern P is generated on the site where the plurality of articles M are to be arrayed in the regular arrangement as described above, on the basis of the reference article Ma that has already been placed, and thereby the position and orientation of the pattern coordinate system of the arrangement pattern P at the site are obtained. The pattern coordinate system 26 used in the arrangement form is converted into the pattern coordinate system of the generated arrangement pattern P, and thereby an actual position or a position in a robot coordinated system (or position and orientation, in a case where the relative rotation angle R is designated) of the pattern element on the site (i.e., the article M) is determined.

The interference judging section 18 predictively judges as to whether an interference is caused between the article Mb capable of being placed on the above-described second pattern element in the arrangement pattern P and the other articles M including the reference article Ma, with use of the shape information Ds of the article M and the position information Dp of the article M obtained by the vision sensor 14. The shape information Ds may be information previously provided to the vision sensor 14 for the detection of the article M, or information obtained by the vision sensor 14 from actual imaging data. It may be defined that the "interference" means a situation where two articles M placed on the site overlap with each other, but does not mean a situation where, e.g., the two articles M come into static contact with each other on the lateral surfaces thereof. Alternatively, the "interference" may include such a statically contacting situation. As for the shape information Ds, information of an actual shape may be used if the article M has a simple two-dimensional shape, such as a circle or a rectangle. If the two-dimensional outer shape of the article M is not simple, an actual shape may be converted into a simple shape so as to obtain the shape information Ds.

Figure 7:
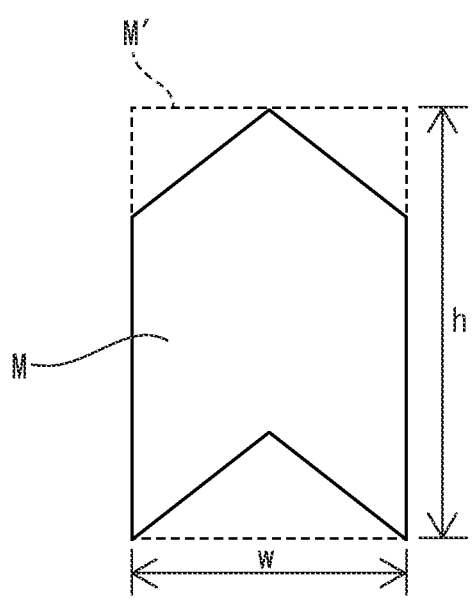
FIG. 7 is an illustration of an example of an article.

FIG. 7 illustrates an example of the two-dimensional outer shape of the article M. In the illustrated example, the article M has an arrowhead shape. In this case, the shape information Ds used by the interference judging section 18 may be information of the actual arrowhead shape, or alternatively, may be information of, e.g., a circumscribed rectangle M' (illustrated by a dotted line) that circumscribes the actual arrowhead shape. The interference judging section 18 may judge as to whether the interference is caused between the articles M, by using the circumscribed rectangle M' instead of the actual arrowhead shape. The circumscribed shape may be selected from any other various simple shapes, such as circle, triangle, etc., provided that it can facilitate the judgment of the interference.

In a case where all of the articles M placed in the random arrangement have the same shape, the size of the circumscribed shape M' used for the shape information Ds may be set in advance. In the example illustrated in FIG. 7, an operator may previously set the width w and height h of the circumscribed shape M' and provide them to the interference judging section 18 (i.e., input them to the control device described later). Alternatively, the image processing section of the vision sensor 14 may obtain the circumscribed shape (or the shape information Ds), based on information of an actual outer shape of the article M captured by the vision sensor 14. In a case where the articles M placed in the random arrangement have various shapes, the vision sensor 14 obtains the circumscribed shapes based on the actual outer shapes of the articles M.

Figure 8A:
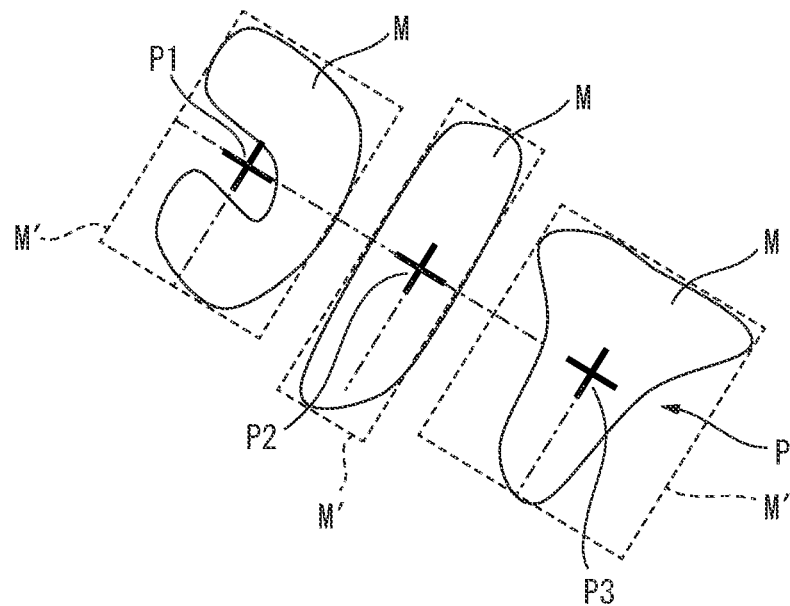
FIGS. 8A and 8B are illustrations of other examples of articles arrayed in accordance with an arrangement pattern.
Figure 8B:
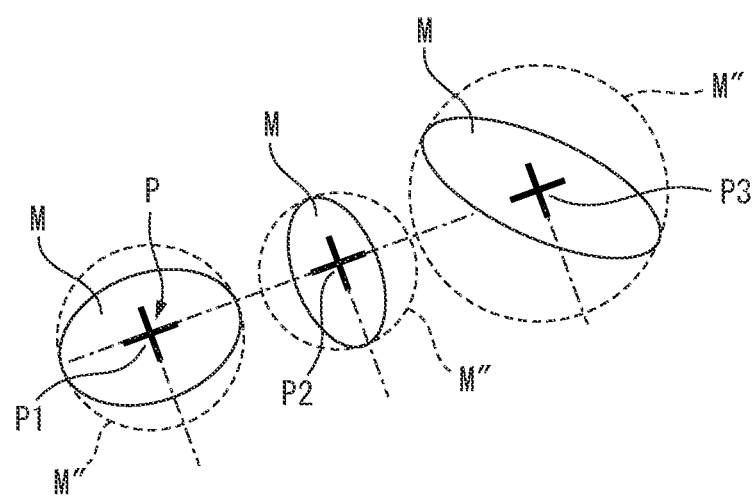

When the circumscribed shape is used for the shape information Ds, it is possible to relatively easily execute the judgment of interference of the articles M having complex shapes, e.g., as illustrated in FIGS. 8A-8B. Further to the judgment of interference, it is also possible to facilitate the motion of the robot 12 to array the articles M having complex shapes in accordance with the arrangement pattern P, by using the circumscribed shape. In a case where the articles M have complex shapes as illustrated in FIGS. 8A-8B, an optimum circumscribed shape may be obtained by, e.g., a known blob analysis performed for the actual outer shape of the article M by the image processing section of the vision sensor 14. Higher reliability of the interference judgment and higher efficiency (or yield ratio) of the arraying operation are achieved by a smaller difference between the actual and circumscribed shapes of the article M.

FIG. 8A illustrates a state where three articles M having mutually different, complex two-dimensional outer shapes are arrayed in the regular arrangement, with the orientations of the articles being considered, in accordance with the arrangement pattern P illustrated in FIG. 2. In this configuration, the vision sensor 14 obtains the circumscribed rectangles M' (depicted by dotted lines) respectively based on the actual shapes of the articles M, and the interference judging section 18 judges as to whether the interference is caused, by using the circumscribed rectangles M' as the shape information Ds. The robot 12 operates to array and place the articles M, judged to cause no interference, in the regular arrangement in accordance with the arrangement pattern P generated on site, through the aforementioned procedure. In the example illustrated in FIG. 8A, the geometrical centers of the circumscribed rectangles M' of the articles M are respectively disposed to be positioned at three pattern elements P1, P2 and P3 in the arrangement pattern P, and the longitudinal axes of the circumscribed rectangles M' of the articles M are respectively disposed to coincide with the relative rotation angles R (0°) designated in the corresponding pattern elements P1, P2 and P3.

FIG. 8B illustrates a state where three articles M having mutually different, elliptical two-dimensional shapes are arrayed in the regular arrangement, with the orientations of the articles being not considered, in accordance with the arrangement pattern P illustrated in FIG. 2. In this configuration, the vision sensor 14 obtains circumscribed circles M" (depicted by dotted lines) respectively based on the actual outer shapes of the articles M, and the interference judging section 18 judges as to whether interference is caused, by using the circumscribed circles M" as the shape information Ds. The robot 12 operates to array and place the articles M, judged to cause no interference, in the regular arrangement in accordance with the arrangement pattern P generated on site, through the aforementioned procedure. In the example illustrated in FIG. 8B, the geometrical centers of the circumscribed circles M" of the articles M are disposed to be positioned at three pattern elements P1, P2 and P3 in the arrangement pattern P. Since the illustrated regular arrangement does not consider the orientations of the articles, the relative rotation angle R is not designated in the pattern elements P1, P2 and P3. In this connection, in the configuration in which the regular arrangement considers the orientations of the articles, using a circle as the circumscribed shape does not make it possible to recreate the orientation (i.e., the relative rotation angle R) represented by the pattern element, and therefore a simple shape other than the circle, such as a rectangle, is used as the circumscribed shape. On the other hand, in the configuration in which the regular arrangement does not consider the orientation, using a circle as the circumscribed shape makes it possible to execute the interference judgment regardless of the orientation of the article M.

The arrangement pattern generating section 16 may select any one of the plurality of articles M placed in the random arrangement as the reference article Ma in consideration of the judgment performed by the interference judging section 18, when generating the arrangement pattern P on site. For example, when selecting the reference article Ma, some of the plurality of articles M placed in the random arrangement are first selected as reference candidates, and the aforementioned interference judgment is performed by sequentially using the reference candidates one by one as a provisional reference article Ma. At a time when one reference candidate, permitting the arrangement pattern P to be generated with no interference caused between the articles M, is found, it is possible to generate the arrangement pattern P with use of the reference candidate as a proper reference article Ma.

The picking motion generating section 20 generates the picking motion with use of the position information Dp of the article M obtained by the vision sensor 14, so as to make the robot 12 pick up, by the picking motion, an article Mb other than the reference article Ma among the plurality of articles M placed in the random arrangement. When the picking motion generating section 20 considers the judgment result of the interference judging section 18, it is possible to generate the picking motion achieving an efficient arraying operation.

The arraying motion generating section 22 generates the arraying motion, so as to make the robot 12 place, by the arraying motion, the picked up article Mb in a position juxtaposed to the reference article Ma in accordance with the arrangement pattern P. When the arraying motion generating section 22 considers the judgment result of the interference judging section 18, it is possible to generate the arraying motion achieving an efficient arraying operation.

For example, in a configuration where the arrangement pattern P illustrated in FIG. 2 is generated on site and the articles M are arrayed in the form illustrated in FIG. 3, the arrangement pattern P is generated, relative to the article Ma (coinciding with the pattern element P1), under the condition that the other pattern elements P2 and P3 are disposed at positions causing no interference between articles. In a state where the articles M are randomly arranged, if an article Mb exists at a position where an interference may be caused when another article is placed on the pattern element P2, the robot 12 first picks up the article Mb, so as to avoid the predicted interference, and thereafter places the picked-up article Mb to coincide with the pattern element P2 or P3 causing no interference between the articles, so that it is possible to efficiently perform the arraying operation. Thus, when the interference judging section 18 judges that the interference is caused between the articles M, the picking motion generating section 20 may generate the picking motion so as to make the robot 12 pick up an article M causing the interference, from among the plurality of articles placed in the random arrangement, prior to picking up an article M causing no interference, from among the plurality of articles placed in the random arrangement.

The robot controlling section 24 controls the picking motion generated by the picking motion generating section 20 and the arraying motion generated by the arraying motion generating section 22, and thereby makes the robot 12 appropriately operate as described above, so that it is possible to efficiently array the plurality of articles M, including the reference article Ma, in the regular arrangement.

In the article arraying device 10 having the above configuration, the arrangement pattern P is generated on site by considering any one of the plurality of articles M placed in the random arrangement as the reference article Ma, and the robot 12 operates to place the other article Mb in a position juxtaposed to the reference article Ma in accordance with the arrangement pattern P, without moving the reference article Ma, and thereby it is possible to array the articles M in the regular arrangement. Therefore, regarding an operation for rearranging a single article M from the random arrangement to the regular arrangement as a unit operation, it is possible to array the articles M, the number of which is one more than the number of unit operations. During the unit operation, the judgment as to whether the interference is caused between the articles is executed, so as to make the robot 12 perform the picking motion and the arraying motion capable of efficiently avoiding the interference, so that it is possible to improve the efficiency in the arraying operation as an assemblage of unit operations. Also, it is possible to use a general-purpose mechanism as the robot 12 and an end effector such as a gripper, as long as it can perform the picking motion and the arraying motion while holding the article M.

The configuration of the above article arraying device 10 may be described as an article arraying method according to another aspect of the present invention. The article arraying method has a configuration for making a robot 12 array a plurality of articles M so as to rearrange the articles M from a random arrangement to a regular arrangement, and includes the steps of: obtaining position information Dp of each of a plurality of articles M placed in a random arrangement; generating virtually an arrangement pattern P with use of the position information Dp, the arrangement pattern P including a plurality of pattern elements in a predetermined regular arrangement, each pattern element representing a position of an article M, in such a manner that a first pattern element that is any one of the plurality of pattern elements coincides with a position of a reference article Ma that is any one of the plurality of articles M placed in the random arrangement; predictively judging as to whether an interference is caused between an article Mb capable of being placed on a second pattern element in the arrangement pattern P, different from the first pattern element, and another article M including the reference article Ma, with use of shape information Ds of each of the plurality of articles together with the position information Dp; generating a picking motion of the robot 12 with use of the position information Dp in consideration of a judgment of the interference, the robot 12 being configured to pick up, by the picking motion, an article M other than the reference article Ma; generating an arraying motion of the robot 12 in consideration of the judgment of the interference, the robot 12 being configured to place, by the arraying motion, the article Mb picked up by the picking motion in a position juxtaposed to the reference article Ma in accordance with the arrangement pattern P; and controlling the picking motion and the arraying motion of the robot 12, so as to array the plurality of articles M including the reference article Ma in a regular arrangement.

Figure 9:
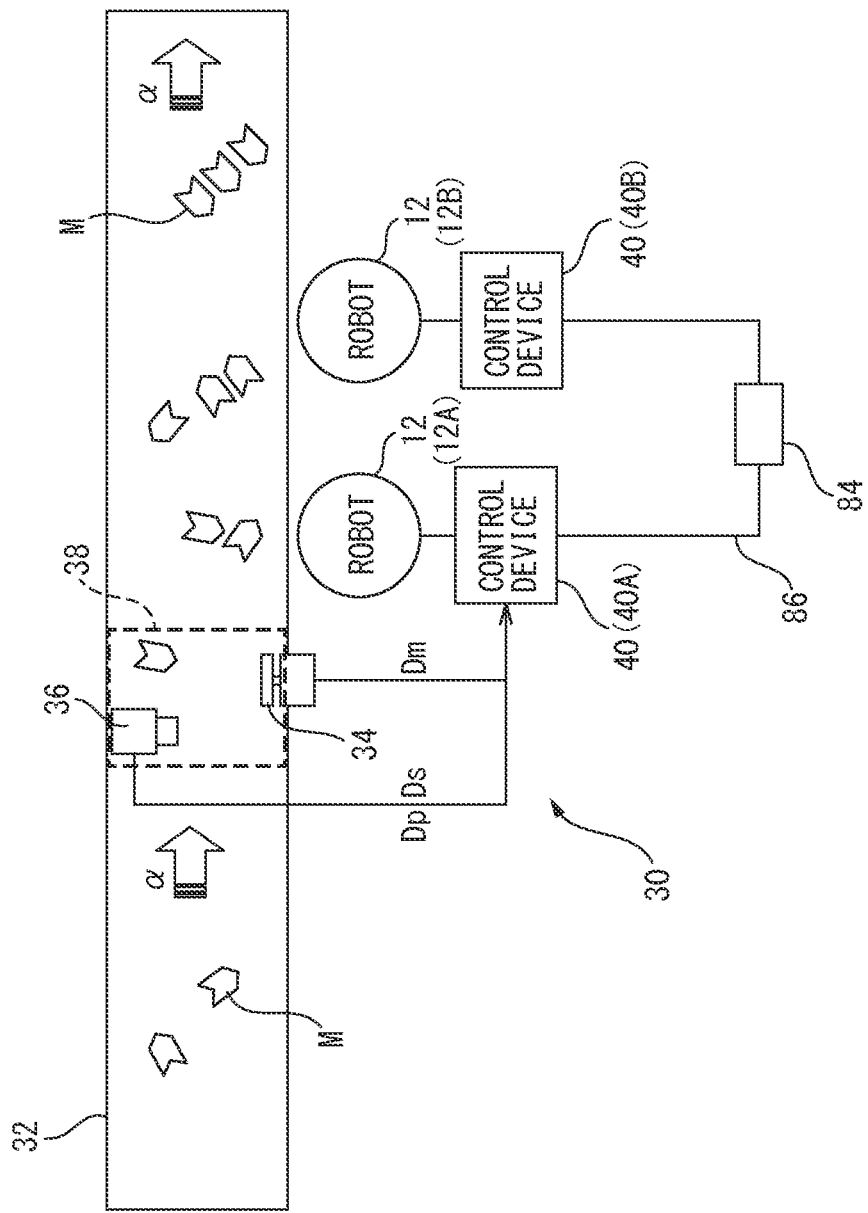
FIG. 9 is a schematic illustration of one embodiment of an article arraying device.
Figure 10:
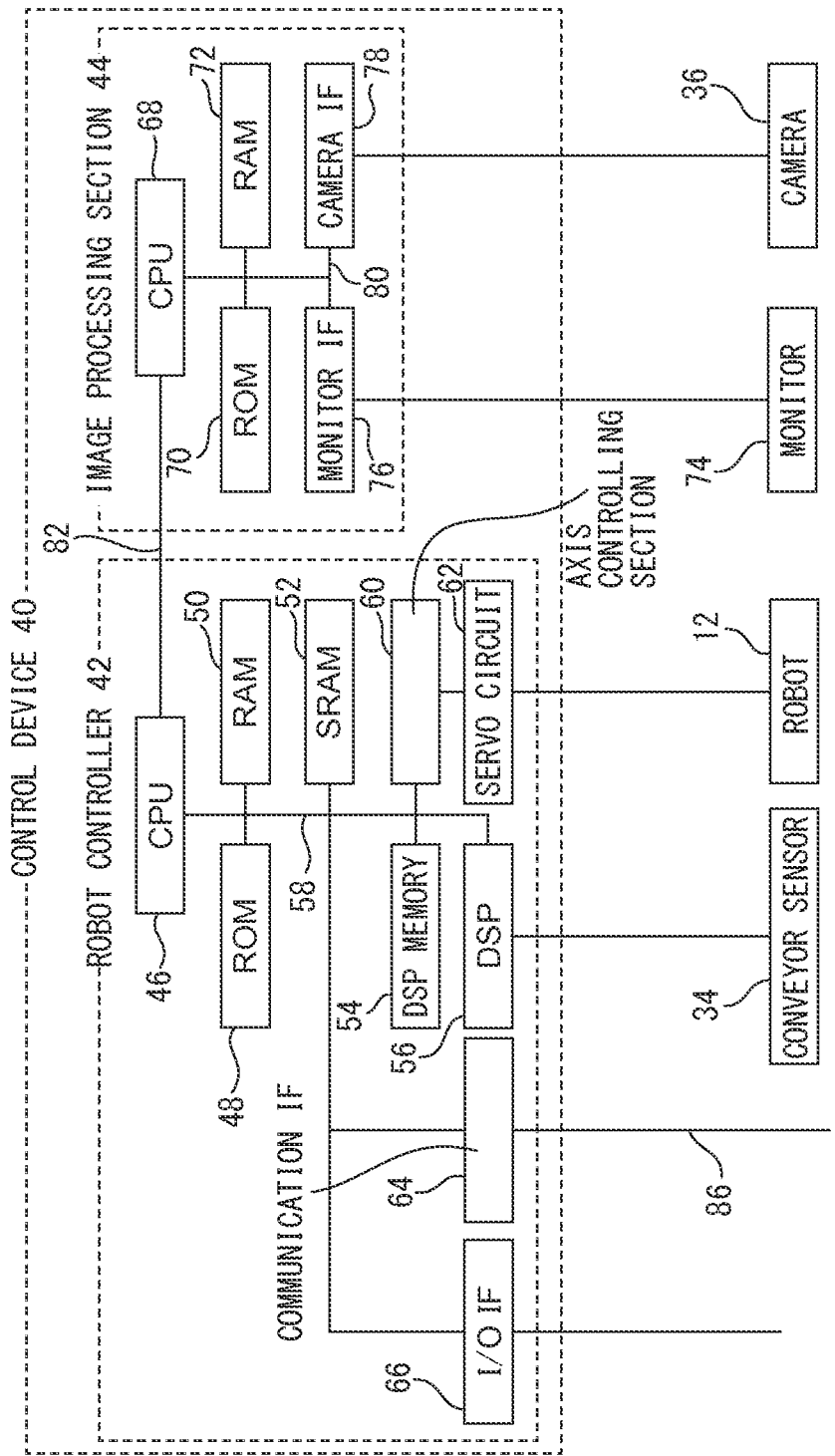
FIG. 10 is a block diagram illustrating an example of a hardware configuration of a control device.

FIG. 9 illustrates an article arraying device 30 according to one embodiment, which has the basic configuration of the article arraying device 10 described above. FIG. 10 and FIG.

Figure 12:
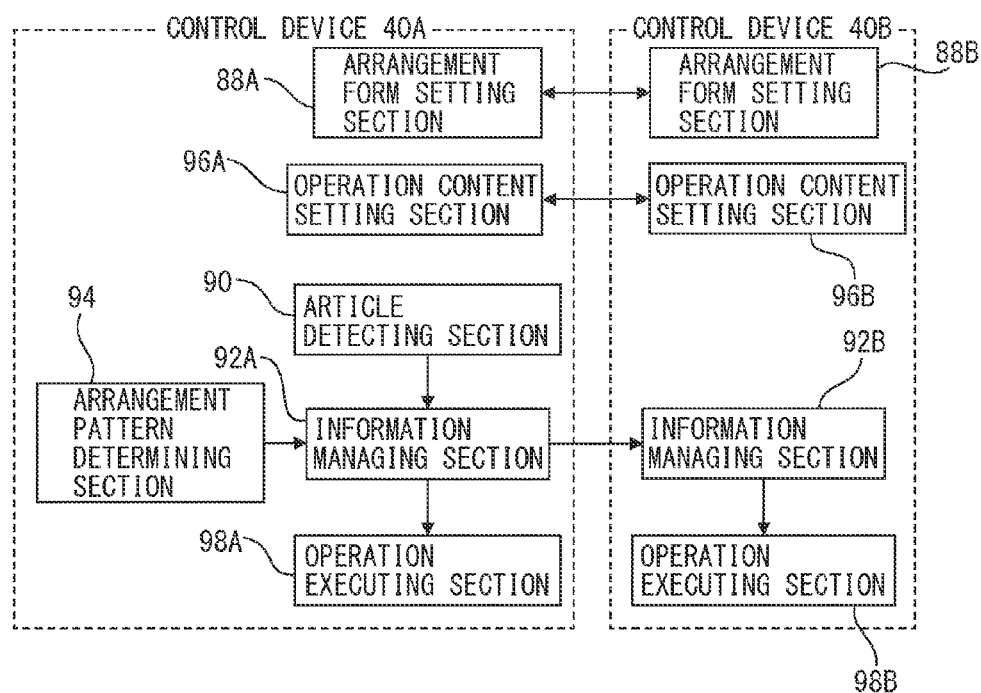
FIG. 12 is a functional block diagram of a control device in the embodiment of FIG. 9.

11 illustrate examples of a hardware configuration of a control device included in the article arraying device 30. FIG. 12 is a functional block diagram of the control device of the article arraying device 30. Components corresponding to the components of the article arraying device 10 are denoted by common reference numerals, and the detailed descriptions thereof are not repeated. The above-described effects obtained by the article arraying device 10 will be more clearly understood by the following description of the article arraying device 30.

The article arraying device 30 includes, in addition to the components of the article arraying device 10, a conveyer 32 configured to convey the article M; and a conveyor sensor 34 configured to obtain conveying information Dm of the conveyer 32. The conveyor 32 includes a known convey member capable of supporting and conveying a plurality of articles M in one direction (a direction of an arrow α, in the drawing) and a known drive mechanism that continuously or intermittently drives the convey member. The conveyor sensor 34 may include an encoder capable of detecting a position or a speed of the convey member or the drive mechanism of the conveyor 32.

The robot 12 is disposed at a predetermined position in a lateral side of the conveyer 32, and the articulated or other mechanical section of the robot performs, in a predetermined working space, the picking motion and the arraying motion with respect to the article M conveyed from upstream in a conveyance direction of the conveyer 32. An image capturing section 36 (hereinafter referred to as a camera 36) of the vision sensor 14 is disposed at a predetermined position upstream of the robot 12, and captures an image of the article M and the conveyor 32, existing in a predetermined viewing field 38, from directly above the conveyor 32.

The article arraying device 30 includes a control device 40 configured to control the robot 12. As exemplarily illustrated in FIG. 10, the control device 40 includes a robot controller 42 and an image processing section 44 of the vision sensor 14. The robot controller 42 includes a CPU 46 including a microprocessor that executes the functions of the arrangement pattern generating section 16, the interference judging section 18, the picking motion generating section 20 and the arraying motion generating section 22 (FIG. 1). A ROM 48, a RAM 50, a SRAM 52, a digital signal processor (DSP) data memory 54 and a digital signal processor (DSP) 56 are connected to the CPU 46 through a bus 58. The ROM 48 stores a program for controlling an entire system including the functions of the arrangement pattern generating section 16, the interference judging section 18, the picking motion generating section 20 and the arraying motion generating section 22 (FIG. 1). The RAM 50 temporarily stores data to be processed by the CPU 46. The SRAM 52 stores an operation program or setting data for the robot 12. The DSP 56 is a processor for processing an output signal from the conveyor sensor 34. The DSP data memory 54 stores setting parameters or processed data obtained by the DSP 56. The DSP 56 has functions of detecting an output from the conveyor sensor 34 at any timing under an instruction from the CPU 46, and writing them in a predetermined area of the DSP data memory 54.

The robot controller 42 includes an axis controlling section 60 for controlling the robot 12. The axis controlling section 60 has the function of the robot controlling section 24 (FIG. 1), and is connected to the robot 12 through a servo circuit 62. Thus, the control device 40 may control the picking motion and the arraying motion of the robot 12. The robot controller 42 further includes a communication interface 64 and an I/O interface 66, and may communicate with another control device or a peripheral device through the interfaces.

The image processing section 44 includes a CPU 68 configured from a microprocessor. The CPU 68 is connected through a bus 80 to a ROM 70, a RAM 72, a monitor interface to which a monitor 74 provided outside the control device 40 is connected, and a camera interface 78 to which the camera 36 is connected. An image captured by the camera 36 is stored in the RAM 72 through the camera interface 78. Data stored in the RAM 72 is analyzed by the CPU 68, and is obtained by the image processing section 44 as information of the position or orientation of the article M (i.e., position information Dp). The image processing section 44 may also obtain the shape information Ds of the article M from the image data stored in the RAM 72. The ROM 70 stores an analysis program for the image processing section 44. The CPU 68 of the image processing section 44 is connected to the CPU 46 of the robot controller 42 through the bus 82 of the control device 40. The CPU 68 of the image processing section 44 may access the SRAM 52 to store various setting information, or access the DSP data memory 54 to read the information of the conveyor sensor 34, through the CPU 46 of the robot controller 42.

Figure 11:
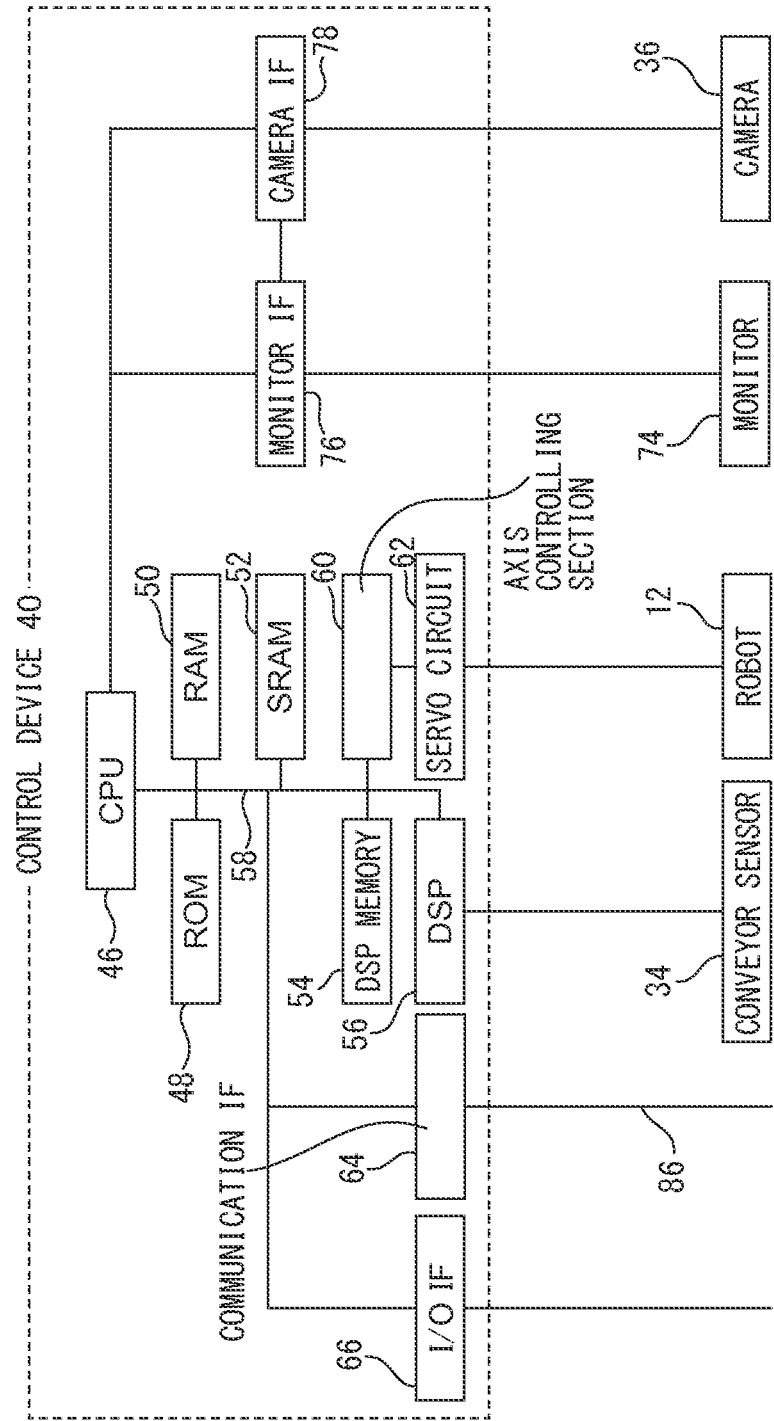
FIG. 11 is a block diagram illustrating another example of a hardware configuration of a control device.

The CPU 68, the ROM 70 and the RAM 72 of the image processing section 44 may be substituted by the CPU 46, the ROM 48 and the RAM 50 of the robot controller 42. FIG. 11 exemplarily illustrates the control device 40 having such a simplified hardware configuration.

In the article arraying device 30, the vision sensor 14 (FIG. 1) obtains the position information Dp of the plurality of articles M placed on the conveyor 32 in a random arrangement. The arrangement pattern generating section 16 (FIG. 1) generates, in a virtual manner, the arrangement pattern P (FIG. 1) on the conveyor 32 by using the reference article Ma (FIG. 1) as one of the articles M, placed on the conveyor 32 in the random arrangement. The interference judging section 18 (FIG. 1) executes the aforementioned interference judgment with respect to the articles M placed on the conveyor 32. The picking motion generating section 20 (FIG. 1) generates the picking motion of the robot 12 with use of the conveying information Dm and the position information Dp, in consideration of the judgment of the interference judging section, the robot 12 being configured to pick up, from the conveyer 32 by the picking motion, the articles Mb (FIG. 1) other than the reference article Ma. The arraying motion generating section 22 (FIG. 1) generates the arraying motion of the robot 12 with use of the conveying information Dm, in consideration of the judgment of the interference judging section 18, the robot 12 being configured to place, on the conveyor 32 by the arraying motion, the article Mb picked up from the conveyor 32, in accordance with the arrangement pattern P.

The picking motion generating section 20 and the arraying motion generating section 22 may respectively generate the picking motion and the arraying motion of the robot 12, in a state where the conveyor 32 conveys the article M to a certain location and stops at the location. In this configuration, the robot controlling section 24 (FIG. 1) controls the picking motion and the arraying motion of the robot 12 with respect to the conveyor 32 that has stopped, so as to make the robot 12 array the plurality of articles M including the reference article Ma in the regular arrangement.

Alternatively, the picking motion generating section 20 and the arraying motion generating section 22 may respectively generate the picking motion and the arraying motion of the robot 12 as motions following the conveyer 32, during the time when the conveyer 32 conveys the articles M at a predetermined speed. In this configuration, the robot controlling section 24 (FIG. 1) controls the picking motion and the arraying motion of the robot 12 to follow the conveying motion of the conveyer 32, so as to make the robot 12 array the plurality of articles M including the reference article Ma in the regular arrangement on the conveyer 32 during the conveying operation.

The interference judging section 18 may predictively judge as to whether the article Mb capable of being placed on the second pattern element protrudes from a predetermined working space. In this case, the arraying motion generating section 22 may generate the arraying motion of the robot 12 in consideration not only of the judgment as to whether the interference is caused, but also of the judgment as to whether the article Mb protrudes from the predetermined working space. The judgment as to whether the article Mb protrudes from the predetermined working space may be performed by, e.g., setting the working space to be conformed to the conveyor 32, previously providing the image processing section 44 of the vision sensor 14 with information of a position of the conveyer 32 (e.g., positions of upper and lower edges, in FIG. 9) that has been held by the image processing section 44, and checking the position information of the conveyor against the position information Dp and the shape information Ds of the article M.

As illustrated in FIG. 9, in the article arraying device 30, the robot 12 is configured by a first mechanical section 12A (hereinafter referred to as a first robot 12A) and a second mechanical section 12B (hereinafter referred to as a second robot 12B), which operate independently from each other. The second robot 12B is disposed downstream of the first robot 12A. According thereto, the control device 40 including the robot controlling section 24 (or the axis controlling section 60) is configured by a first control device 40A for controlling the first robot 12A and a second control device 40B for controlling the second robot 12B. The first and second control devices 40A and 40B may communicate data with each other through a network hub 84 and a wired line or communication cable 86. Communication means other than the wired line or communication cable 86 may be used. Hardware configurations of the first and second control devices 40A and 40B substantially correspond to the hardware configuration of the control device 40 illustrated in FIGS. 10 and 11. However, the second control device 40B is not connected to the camera 36, and thus does not include the image processing section 44.

The conveying information Dm obtained by the conveyor sensor 34 is input to the first control device 40A. The first control device 40A may transmit, via communication, the conveying information Dm thus input, the position information Dp obtained by the image processing section 44, and the shape information Ds (known or obtained information) held by the image processing section 44, to the second control device 40B. The first robot 12A connected to the first control device 40A and the second robot 12B connected to the second control device 40B respectively operate to pick up the article M conveyed from the upstream by the conveyor 32 and to place the article M in the regular arrangement on the conveyer 32, in accordance with the respective motion generation and the result of the respective interference judgment, performed by using the conveying information Dm, the position information Dp and the shape information Ds. In this configuration, the first and second control devices 40A and 40B (i.e., the control device 40) may control, through data communication, the first robot 12A to execute the aforementioned picking motion and arraying motion and also control the second robot 12B to execute the aforementioned picking motion and arraying motion, in accordance with a predetermined ratio of operation. The aforementioned arrangement form defining the number, the positions and the orientations of the articles M placed in the regular arrangement may be set by any one of the control devices 40A and 40B in advance. The arrangement form set by one of the control devices 40A, 40B may be referred to by the other of the control devices 40A, 40B through communication.

FIG. 12 is a functional block diagram illustrating processing units in the control device 40 (the first and second control devices 40A, 40B), which manage information relating to the article M and the arrangement pattern P. Arrows in FIG. 12 depict flows of the information relating to the article M and the arrangement pattern P.

As illustrated in FIG. 12, the first and second control devices 40A and 40B respectively include arrangement form setting sections 88A and 88B. The aforementioned arrangement form may be set by any one of the arrangement form setting sections 88A and 88B. An operator may input coordinate values (X, Y) and/or relative rotation angles R of the pattern elements defined by the arrangement form, while referring to a monitor 74 (FIG. 10). Data of the pattern elements of the arrangement form, defined in the arrangement form setting section 88A, 88B of one of the control devices 40A and 40B, may be transmitted through communication to the arrangement form setting section 88A, 88B of other of the control devices 40A and 40B, and thereby the other arrangement form setting section 88A, 88B may also define the pattern elements of the arrangement form.

An article detecting section 90 of the first control device 40A initiates a detection process for the article M performed by the vision sensor 14 (FIG. 1), upon receiving the conveying information Dm from the conveyor sensor 34 (FIG. 9), the conveying information Dm representing that the conveyor 32 (FIG. 9) has moved by a predetermined distance. Alternatively, the article detecting section 90 may initiate the detection process for the article M upon receiving a certain trigger signal from an external sensor (not illustrated) such as a phototube sensor. Known methods may be adopted for the detection process for the article M, such as a normalized correlation method, in which an image that matches a previously registered model image, is detected in an image captured by the camera (FIG. 9); a generalized Hough transform method, in which a profile of an object is extracted from the previously registered model image and the position, or the position and orientation, of the object in the image captured by the camera 36 is obtained based on the information of the profile; etc.

When the article detecting section 90 successfully detects the article M, the article detecting section 90 transmits, to an information managing section 92A of the first control device 40A, information such as the position information Dp and the shape information Ds of the article M, as well as the conveying information Dm obtained by the conveyor sensor 34 at the instant when the camera 36 captures the image of the article M. The information managing section 92A receives the information from the article detecting section 90, and if no arrangement pattern P is presently used for rearrangement, thereafter requests an arrangement pattern determining section 94 (having the functions of the arrangement pattern generating section 16 and the interference judging section 18 in FIG. 1) of the first control device 40 to generate the arrangement pattern P. The arrangement pattern determining section 94 may refer to the information transmitted from the article detecting section 90 to the information managing section 92A.

The first control device 40A further includes an operation content setting section 96A and an operation executing section 98A (having the functions of the picking motion generating section 20 and the arraying motion generating section 22 in FIG. 1). In the same manner, the second control device 40B includes an information managing section 92B, an operation content setting section 96B, and an operation executing section 98B (having the functions of the picking motion generating section 20 and the arraying motion generating section 22 in FIG. 1).

An example of a process for generating an arrangement pattern for the articles M, executed by the arrangement pattern determining section 94 of the first control device 40A, is described below with reference to FIG. 12 as well as FIGS. 13 to 20. In the illustrated example, the arrangement pattern P illustrated in FIG. 2 is generated on the conveyer 32, and the articles M are arrayed on the conveyer 32 in the form illustrated in FIG. 3. In the illustrated example, the article M has the two-dimensional arrowhead shape illustrated in FIG. 7 and the circumscribed rectangle M' (illustrated by a solid line) of the article M is used for the interference judgment and for the arraying motion generation. In FIGS. 13 to 20, the marks "+" represent the pattern elements P1, P2 and P3 in the arrangement pattern P, and the mark "×" represents the geometrical center of the circumscribed rectangle M' of each article M. In the illustrated example, the geometrical center of the circumscribed rectangle M' of each article M is positioned or aligned at each of the pattern elements P1, P2 and P3, and thereby the arraying operation of the articles M is completed.

First, a reference candidate, as a candidate for the reference article Ma described above, is selected from the plurality of articles M conveyed in the random arrangement by the conveyer 32. The number of the reference candidate may be at least 1 (one). However, when the number of the reference candidates is previously set to be larger than the number of articles M to be arrayed, which is specified by the arrangement form, the arraying operation is not started unless the set numbers of reference candidates are provided in the working space of the robot, even in a situation where the arrangement pattern P can be generated. Thus, the number of the reference candidates is preferably not larger than the number of articles M to be arrayed. In the example illustrated in FIGS. 13 to 20, reference candidates M1, M2 and M3 are selected, the total number of which is the same as the number of (i.e., three) articles M to be arrayed, specified by the arrangement form in FIG. 4. Alternatively, the other configuration may be employed, wherein the number of reference candidates is set to be larger than the number of articles M to be arrayed, and if a state where the set numbers of reference candidates are not provided in the robot working space continues over a predetermined period of time, the article M existing upstream of the robot 12 at that moment may be selected as the reference candidate.

In the example illustrated in FIGS. 13 to 20, the reference candidates M1, M2 and M3 are selected in this order from downstream on the conveyer 32. The reference candidates may be selected in any order. However, when the reference candidates are selected in order from downstream, the number of articles M that cannot be arrayed and thus conveyed toward downstream may be reduced. Also, assuming that, e.g., the articles M, the number of which is the same as the number of articles to be arrayed, are conveyed from upstream, the widest free space is likely to be provided on the conveyer 32 at downstream of the most downstream article M. Thus, in the example illustrated in FIGS. 13 to 20, it is verified whether each of the reference candidates M1, M2 and M3 can be used as the reference article Ma in order, starting from the most-downstream reference candidate M1.

Figure 13:
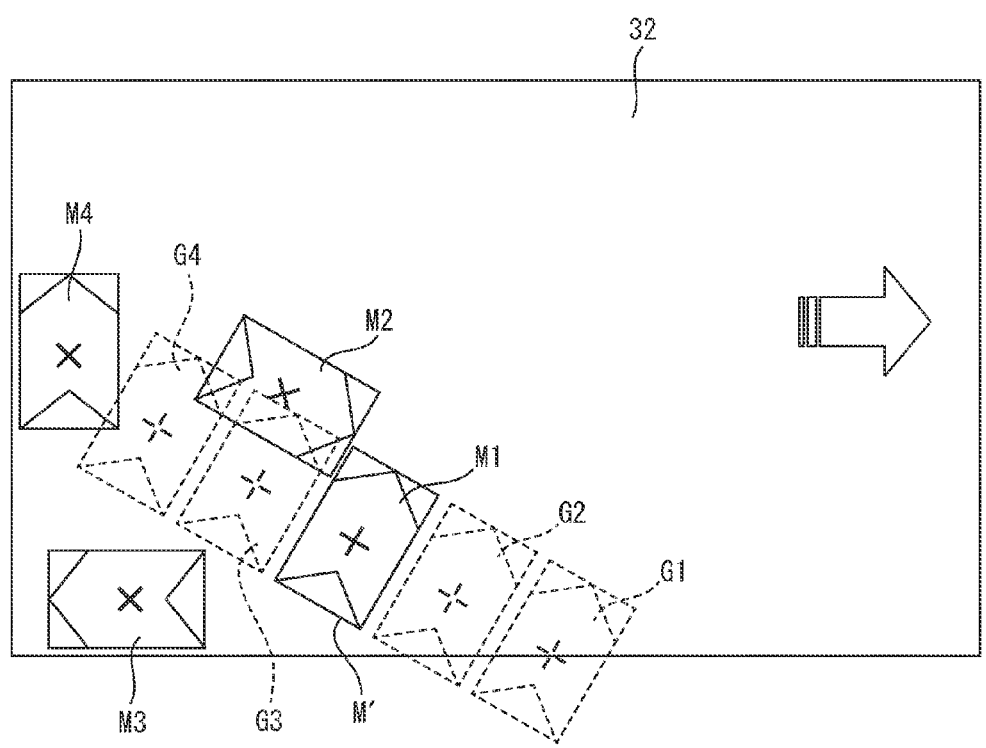
FIG. 13 is a schematic illustration depicting a process for generating an arrangement pattern in the embodiment of FIG. 9.

FIG. 13 illustrates a state where the most-downstream reference candidate M1 is supposed as the reference article Ma. The reference article Ma is an article that is not moved during the arraying operation, and therefore it is first verified whether the other article Mb (FIG. 3) is able to be placed in a position juxtaposed to the most-downstream reference candidate M1 without moving the reference candidate M1. In this configuration, three ways for placing the other articles Mb may be assumed in accordance with the selection of the placement of the reference candidate M1, i.e., at the center, or one end, or another end of the arrangement pattern P. More specifically, four possible regions G1, G2, G3 and G4 may be supposed around the reference candidates M1, on which the other articles Mb are placed so as to achieve the arrangement pattern P, and three possible combinations of regions (G1 and G2), (G2 and G3) and (G3 and G4) may be supposed, on which the other articles Mb are placed. In the example illustrated in FIG. 13, each of the regions G1 and G2 is a region on which the article Mb cannot be placed in a physical sense since the article M protrudes from the conveyer 32. Therefore, it is verified whether the article M can be placed on the region G3 or G4.

In order to place the article Mb on the region G3 or G4, it is required that the regions G3 and G4 are completely free regions. If the other article Mb at least partially overlaps with the region G3 or G4, it is necessary to previously move the article Mb so as to ensure the completely free region. In the example illustrated in FIG. 13, a part of the reference candidate M2 overlaps with both of the regions G3 and G4 on which the article may be placed, and a part of the subsequent article M4, that is not a reference candidate, overlaps with the region G4. Therefore, the reference candidate M2 is first picked up and is placed on the region G3 and thereafter the article M4 is picked up and placed on the region G4, whereby it is possible to complete the arraying operation of the articles M. If the article M4 is moved to the region G4 without picking up the reference candidate M2, the interference is caused between the article M4 and the reference candidate M2. Although the other reference candidate M3 is positioned downstream of the article M4, the interference is caused between the article M4 and the reference candidate M3 if the reference candidate M3 is moved to the region G4 without picking up the article M4. In order to avoid the interference and complete the arraying operation of the articles M, it is necessary to pick up the article M4 that may cause the interference, prior to picking up the reference candidate M3.

Figure 14:
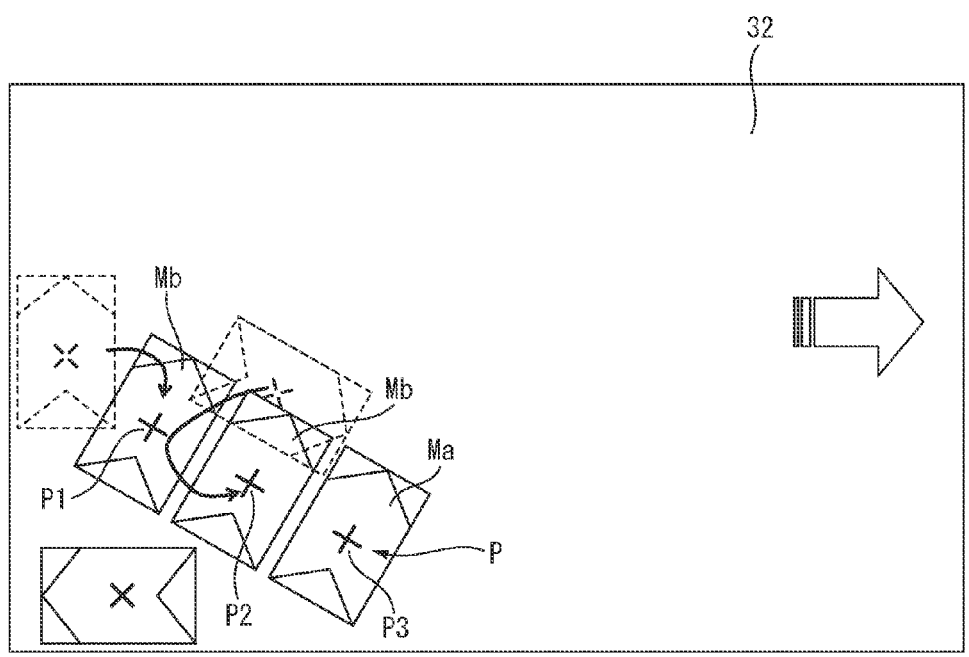
FIG. 14 is a schematic illustration depicting a process for generating an arrangement pattern in the embodiment of FIG. 9.

FIG. 14 illustrates a state where the arrangement pattern P is generated by using the reference candidate M1 as the reference article Ma, based on a result of verification performed by the arrangement pattern determining section 94 (or the interference judging section 18), and the robot 12 has placed the other articles Mb in positions juxtaposed to the reference article Ma in accordance with the arrangement pattern P.

Figure 15:
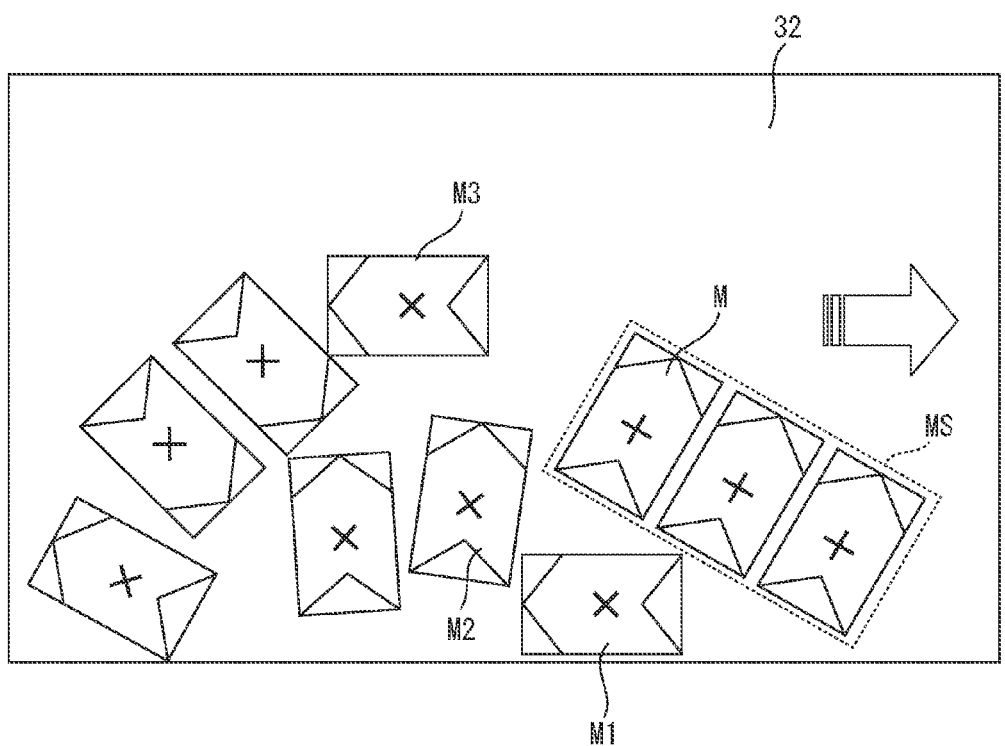
FIG. 15 is a schematic illustration depicting a process for generating an arrangement pattern in the embodiment of FIG. 9.

FIG. 15 illustrates an article set MS including three articles M that has been completed in the arraying operation, as well as a plurality of subsequent articles M placed in a random arrangement on the conveyer 32. The subsequent generation of the arrangement pattern P may be started at the time when, for example, the previous arraying operation for the article set MS is completed. In the same manner as the procedure described above, three reference candidates M1, M2 and M3 (the present M1 corresponds to the reference candidate M3 in the previous arraying operation) are selected in this order from downstream except for the article set MS, and it is verified whether any one of the reference candidates can be used as the reference article Ma.

Figure 16:
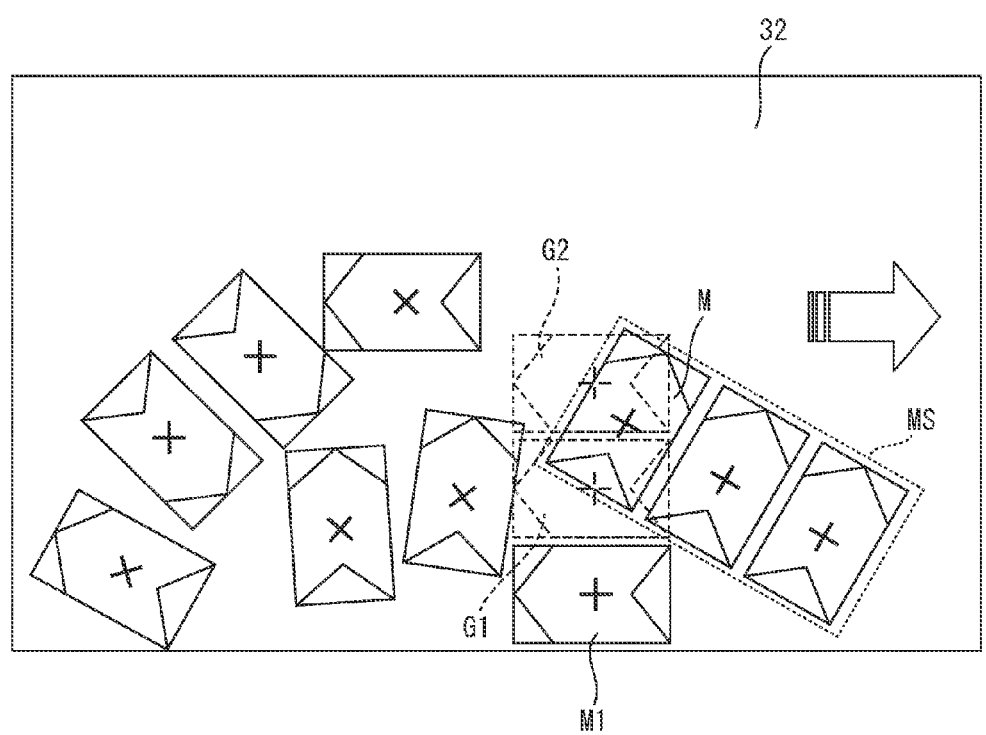
FIG. 16 is a schematic illustration depicting a process for generating an arrangement pattern in the embodiment of FIG. 9.

FIG. 16 illustrates a state where the most-downstream reference candidate M1 is supposed as the reference article Ma. As illustrated, if the reference candidate M1 is used as the reference article Ma, each of two regions G1 and G2, at which the other article Mb may be placed to achieve the arrangement pattern P, partially overlaps with the article M of the article set MS that has been completed in the arraying operation (i.e., which is no longer moved). Therefore, it is understood that no other article Mb is able to be placed on the regions G1 and G2 and thus the arrangement pattern P is not able to be generated. Accordingly, the reference candidate M1 cannot be used as the reference article Ma.

Figure 17:
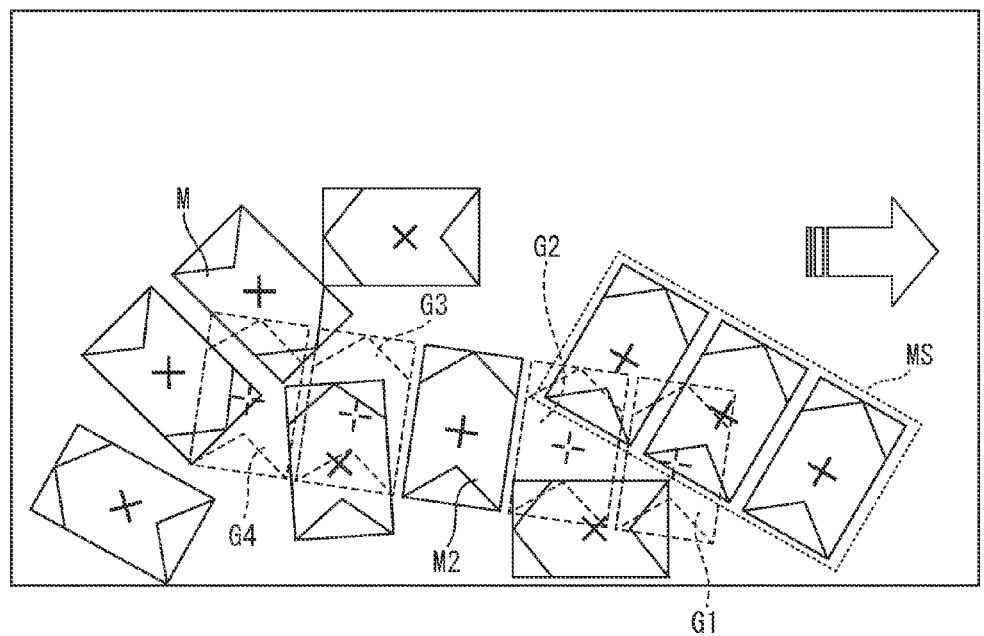
FIG. 17 is a schematic illustration depicting a process for generating an arrangement pattern in the embodiment of FIG. 9.

FIG. 17 illustrates a state where the reference candidate M2 is supposed as the reference article Ma. As illustrated, if the reference candidate M2 is used as the reference article Ma, each of four regions G1, G2, G3 and G4, on which the other article Mb may be placed to achieve the arrangement pattern P, partially overlaps with at least two other articles M. Therefore, it is understood that no other article Mb is able to be placed on the regions G1, G2, G3 and G4 and thus the arrangement pattern P is not able to be generated. Accordingly, the reference candidate M2 cannot be used as the reference article Ma.

Figure 18:
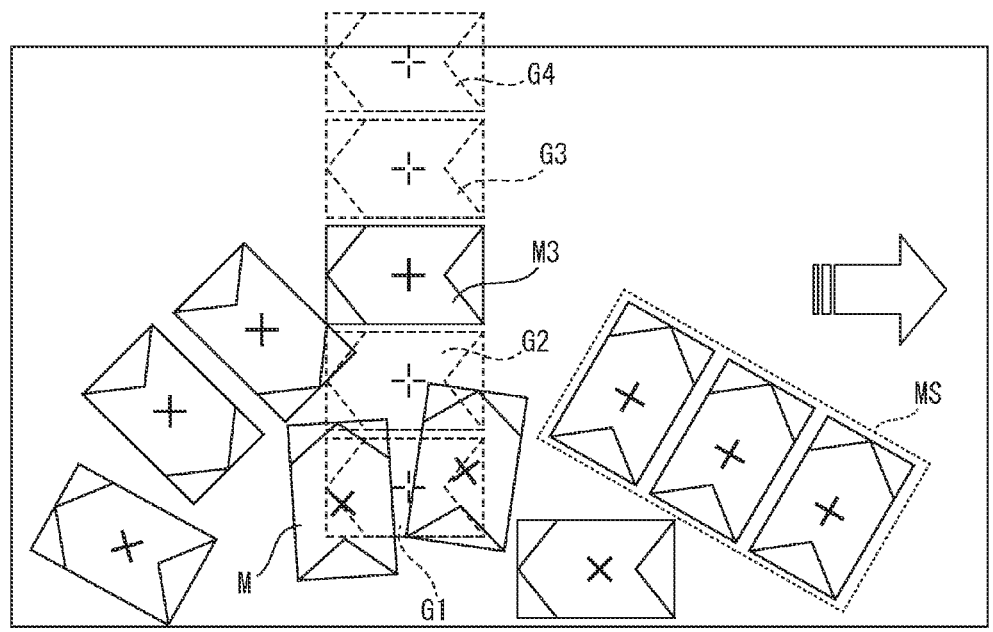
FIG. 18 is a schematic illustration depicting a process for generating an arrangement pattern in the embodiment of FIG. 9.

FIG. 18 illustrates a state where the reference candidate M3 is supposed as the reference article Ma. As illustrated, if the reference candidate M3 is used as the reference article Ma, each of four regions G1, G2, G3 and G4, on which the other article Mb may be placed to achieve the arrangement pattern P, partially overlaps with two or more other articles M or protrudes from the conveyer 32, except for the region G3. Therefore, it is understood that the arrangement pattern P is not able to be generated with the use of the regions G1, G2, G3 and G4. Accordingly, the reference candidate M3 cannot be used as the reference article Ma.

As described above, none of the reference candidates M1 to M3 can be used as the reference article Ma in the state illustrated in FIG. 15, and therefore the similar verification is performed with respect to the other reference candidate selected from articles M placed further upstream. In this case, the reference candidates M1 to M3 are difficult to be placed in the regular arrangement in accordance with the arrangement pattern P, so that the efficiency (or yield ratio) of the arraying operation may be degraded. In order to address such a situation, the article arraying device 30 may have a following configuration.

The article arraying device 30 has a configuration wherein, when it is predicted, as a result of considering the judgment of the arrangement pattern determining section 94 (or interference judging section 18), that the robot 12 is not able to place the other article M in a position juxtaposed to the reference article Ma (more specifically, any one of the reference candidates M1 to M3 that cannot be used as the reference article Ma, in the above illustrated example) in accordance with the arrangement pattern P, the picking motion generating section 20 (FIG. 1) generates an exceptional picking motion of the robot 12 with use of the position information Dp, the robot 12 being configured to pick up, by the exceptional picking motion, a plurality of articles M (the reference candidates M1 to M3, in the above illustrated example) including the reference article Ma, the arrangement pattern generating section 16 (FIG. 1) generates, in a virtual manner, an alternative arrangement pattern PA (FIG. 19) including a plurality of alternative pattern elements respectively corresponding to the plurality of pattern elements, in a free space S (FIG. 19) where it is predicted that no interference is caused between a plurality of articles M (the reference candidates M1 to M3, in the above illustrated example) capable of being placed on the plurality of alternative pattern elements and another article M, and the arraying motion generating section 22 (FIG. 1) generates an exceptional arraying motion of the robot 12, the robot 12 being configured to place, by the exceptional arraying motion, the plurality of articles M picked up by the exceptional picking motion in positions juxtaposed to each other in the free space S in accordance with the alternative arrangement pattern PA.

In the configuration described above, the vision sensor 14 (FIG. 1) may obtain the position information and shape information of the free space S, and the arrangement pattern generating section 16 may generate the alternative arrangement pattern PA with use of the position information and shape information of the free space S obtained by the vision sensor 14. Alternatively, the free space S may be previously determined as a space where articles M in the random arrangement are not placed, and the arrangement pattern generating section 16 may generate the alternative arrangement pattern PA with use of the previously provided position information and shape information of the free space S.

An example of the exceptional motion of the robot 12 is described below with reference to FIG. 19 and FIG. 20. In a state illustrated in FIG. 19 (which is the same as the state in FIG. 15), the free space S, in which no article M exists, is defined in, e.g., an upside, in the drawing, of the conveyer 32. The free space S can be easily recognized based on the position information Dp and the shape information Ds of the article M, held by the vision sensor 14 (or article detecting section 90), and/or an arraying operation history of the robot 12 held by the information managing section 92A. For example, the working space of the robot 12 on the conveyor 32 is divided in a lattice pattern, and a binary map is provided by coding respective grids in such a manner that "0" represents a grid overlapping a location in which the article M exists, and "1" represents a grid overlapping a location in which no article M exists. In a set of grids represented by "1" in the map, a portion capable of encompassing a shape corresponding to an integrated outer shape of the articles M arrayed in the arrangement pattern P is searched, and if such a portion is found, the found portion may be recognized as the free space S.

Figure 19:
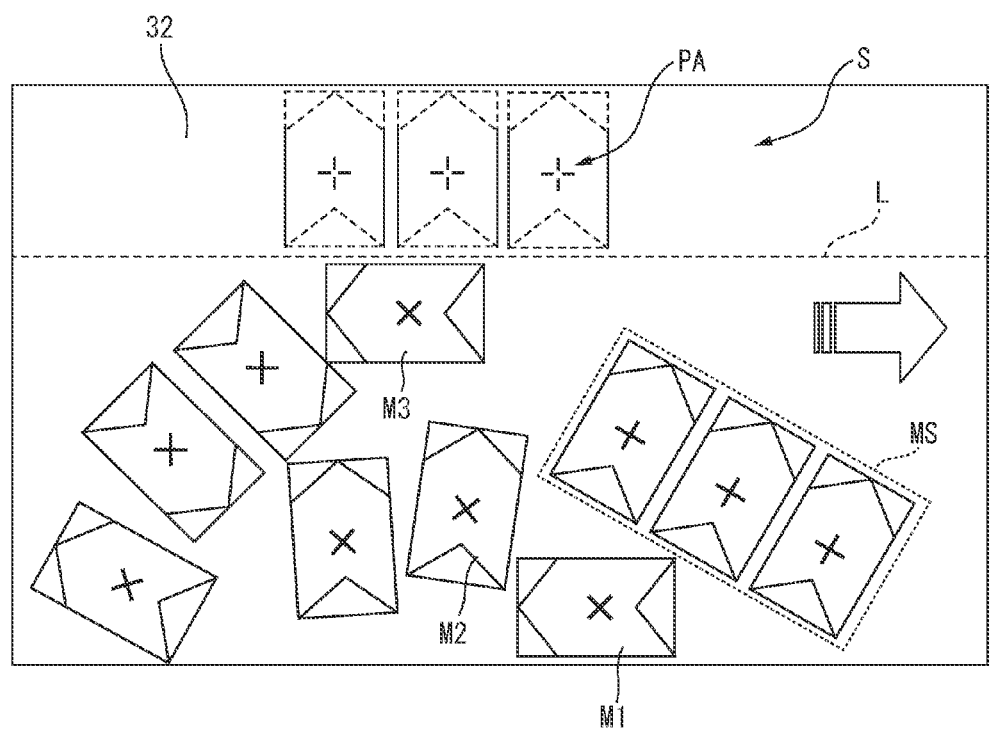
FIG. 19 is a schematic illustration depicting a process for generating an arrangement pattern in the embodiment of FIG. 9.

FIG. 19 illustrates the alternative arrangement pattern PA generated in the free space S. FIG. 20 illustrates a state where three articles M (more specifically, the reference candidates M1 to M3) including the reference article Ma (more specifically, any one of the reference candidates M1 to M3 unusable as the reference article Ma) are placed in the regular arrangement in the free space S, in accordance with the alternative arrangement pattern PA.

Figure 20:
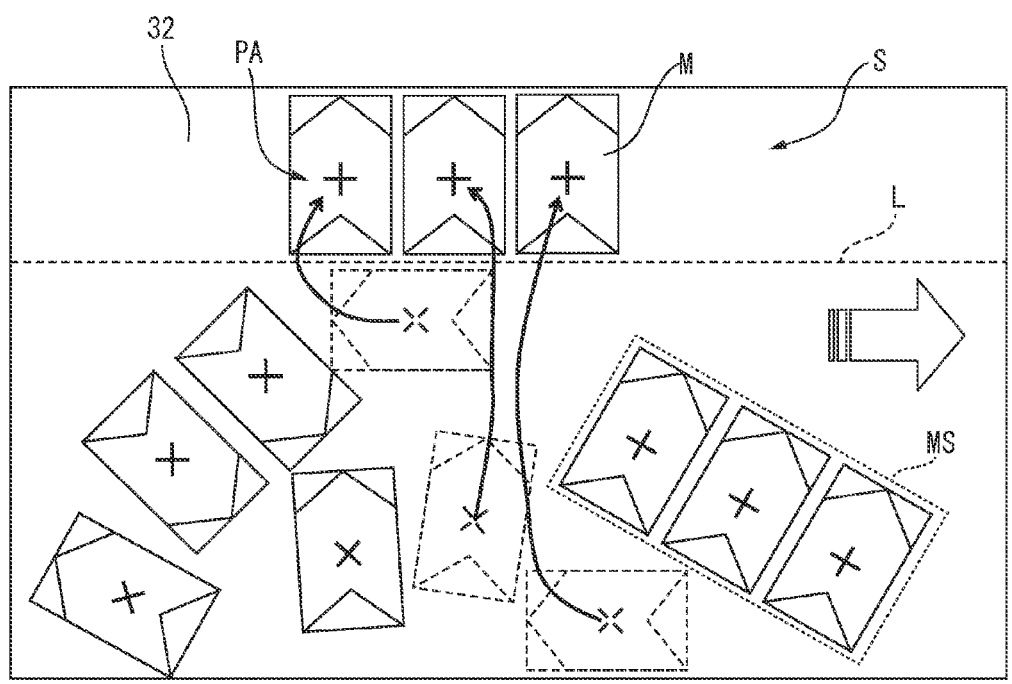
FIG. 20 is a schematic illustration depicting a process for generating an arrangement pattern in the embodiment of FIG. 9.

In a configuration where the free space S is previously defined as a space in which the articles M in the random arrangement is not placed, as illustrated by a dotted zoning line (or virtual line) L in FIG. 19 and FIG. 20, the normal arraying operation other than the exceptional operation may be performed in such a manner that no article M is arrayed in the free space S, so that it is possible to ensure the free space S for the possible exceptional operation. According thereto, it is possible to readily generate the alternative arrangement pattern PA in the free space S at a time when the state illustrated in FIG. 15 occurs.

Referring back to FIG. 12, various processing executed by the control devices 40A and 40B are described. The arrangement pattern determining section 94 transmits to the information managing section 92A, information of the position and orientation of the pattern coordinate system of the arrangement pattern P generated on the conveyer 32 through the above-described procedure, and information of a plurality of articles M rearranged from the random arrangement to the regular arrangement in accordance with the arrangement pattern P and of a moving order of the articles M. In a case where the alternative arrangement pattern PA is used, the arrangement pattern determining section 94 transmits to the information managing section 92A, information of the position and orientation of the pattern coordinate system of the alternative arrangement pattern PA generated on the conveyer 32 through the above-described procedure, information of a plurality of articles M rearranged from the random arrangement to the regular arrangement in accordance with the alternative arrangement pattern PA and of a moving order of the articles M, and the position information of the alternative arrangement pattern PA as well as the conveying information obtained by the conveyor sensor 34 at an instant when the alternative arrangement pattern PA is generated. The information managing section 92A determines the position, or the position and orientation, of each pattern element in the arrangement pattern P, based on the information of the position and orientation of the pattern coordinate system received from the arrangement pattern determining section 94 and the information of the position, or the position and orientation, of each pattern element in the arrangement form previously set by the arrangement form setting section 88A.

In the embodiment described above, the position or the position and orientation of each pattern element in the arrangement pattern P, and the position or the position and orientation of the article to be rearranged from the random arrangement to the regular arrangement in accordance with the arrangement pattern P, are obtained as values in the camera coordinate system defined in the camera 36. In this configuration, the relative positional relationship between the camera coordinate system and the robot coordinate system as the basis of the motions of the robot 12 is obtained in advance, so that a value in the camera coordinate system is able to be converted into a value in the robot coordinate system with a known coordinate transformation calculation. In a case where the robot coordinate system is shared by the first and second control devices 40A and 40B, the information of the position or the position and orientation of the pattern element in the arrangement pattern P and of the position or the position and orientation of the article M to be rearranged in accordance with the arrangement pattern P may be used in common by the first and second robots 12A and 12B. For example, once the vision sensor 14 obtains the information of the position or the position and orientation of the article M, the first and second control devices 40A and 40B may control the corresponding first and second robots 12A and 12B and make them execute the picking motion and the arraying motion for the article M. To this end, the information managing section 92A may transmit to the information managing section 92B of the second control device 40B, the information of the position or the position and orientation of the pattern element in the arrangement pattern P and of the position or the position and orientation of the article to be rearranged in accordance with the arrangement pattern P.

The operation contents, such as a ratio of operation, etc., of the first and second robots 12A and 12B may be set in advance by the operation content setting section 96A, 96B of either one of the first and second control device 40A and 40B, and may be shared by the operation content setting sections 96A and 96B. For example, in a case where the ratio of operation between the first and second robots 12A and 12B is set to 1:1, the first and second robots 12A and 12B alternately perform the arraying operation in such a manner that, in the example illustrated in FIGS. 13 to 20, the first robot 12A picks up the reference candidate M2 and places it on the region G3 and picks up the article M4, that is not a candidate, and places it on the region G4, so as to complete an article arraying in accordance with an arrangement pattern P, and thereafter the second robot 12B operates to complete an article arraying in accordance with the next arrangement pattern P. Thus, in this case, a single robot 12 solely assumes the completion of an article arraying in accordance with an arrangement pattern P.

Figure 21:
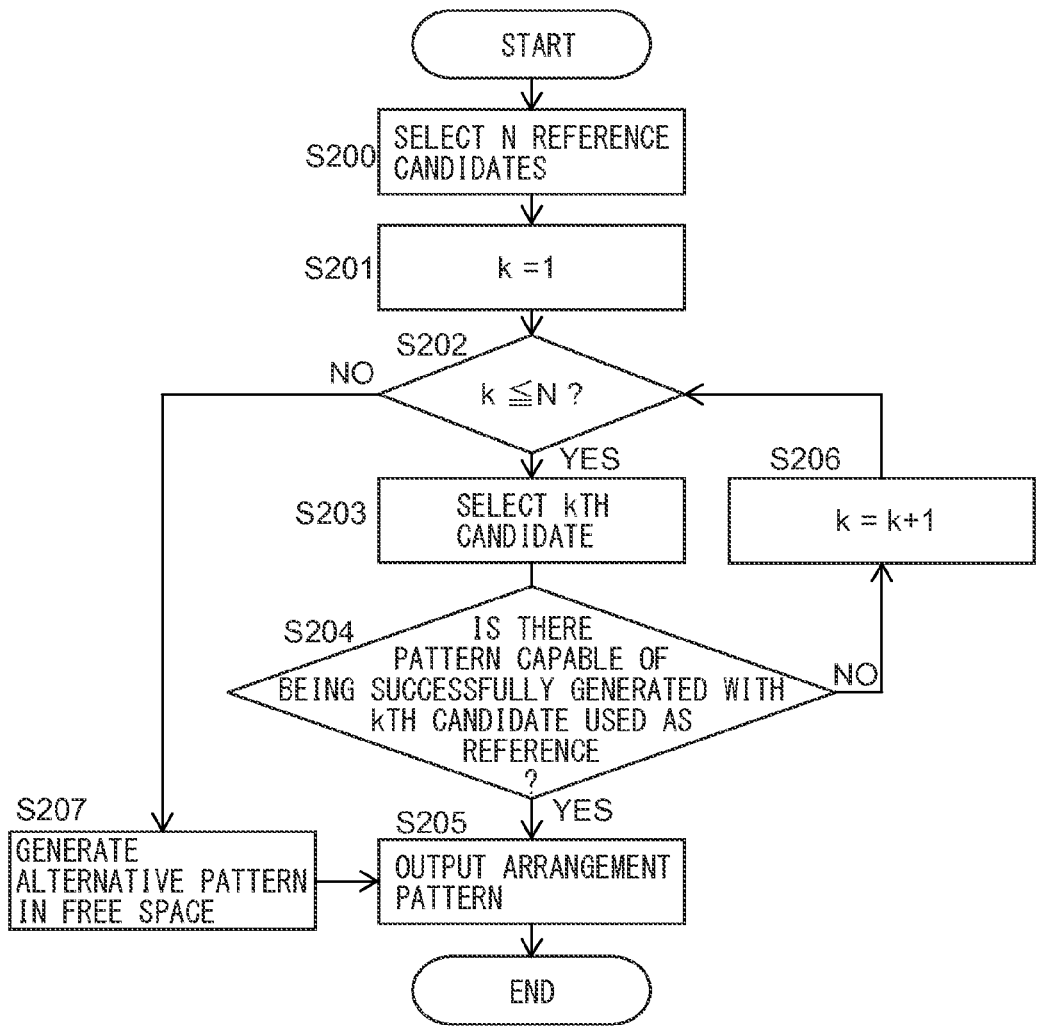
FIG. 21 is a flowchart of an arrangement pattern generating process executed in a control device.

FIG. 21 illustrates a flow of processing, in which the arrangement pattern determining section 94 of the first control device 40A sequentially determines arrangement patterns P and outputs the determined arrangement patterns P to the information managing section 92A. In step S200, the arrangement pattern determining section 94 selects "N" reference candidates from a plurality of articles M placed in a random arrangement. As already described, "N" may be any number not smaller than 1. Then, the reference candidates are numbered by "1", "2", . . . and "N", sequentially from the most downstream side for example, and it is verified whether each of the reference candidates can be used as the reference article Ma sequentially from the reference candidate of number "1", as follows. Specifically, in step S201, a variable "k" representing the number provided to the reference candidate is set to "1". In step S202, it is judged whether "k" exceeds the predetermined number (=N) of reference candidates. When "k" exceeds "N", it is judged that there is no reference candidate capable of being used as the reference article Ma. Then, the alternative arrangement pattern PA is generated in the free space S on the conveyer 32 (step S207), and the alternative arrangement pattern PA is output and the processing is terminated (step S205). When "k" does not exceed "N", the reference candidate, the number of which corresponds to the value of "k", is selected (step S203), and several arrangement patterns P capable of being generated when the selected reference candidate is used as the reference article Ma are temporarily generated, and simultaneously, it is judged whether an article arraying in accordance with the temporarily generated arrangement patterns P can be successfully completed while avoiding interference between the articles (step S204). When the arrangement pattern P enabling such an article arraying operation is found, the found arrangement pattern P is output and the processing is terminated (step S205).

Figure 22:
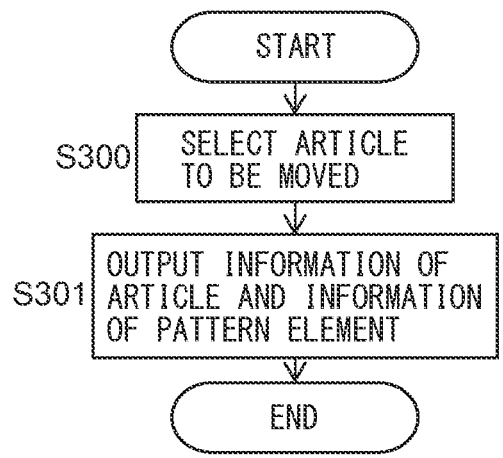
FIG. 22 is a flowchart of an arrangement pattern generating process executed in a control device.

FIG. 22 illustrates a flow of processing, in which the information managing section 92A of the first control device 40A selects information of the article M to be subsequently processed, and outputs the information of the article M to the operation executing section 98A. In step S300, the information managing section 92A receives from the arrangement pattern determining section 94, information of the arrangement pattern P for the next arraying operation, and information of the articles M moved in accordance with the arrangement pattern P and of the moving order of the articles M. The information managing section 92A has recorded the number of articles M that have passed through the working space of the first robot 12A (i.e., passed article number), the number of articles subjected to the arraying operation performed by the first robot 12A among the passed articles (i.e., arrayed article number), and the number of articles selected as the reference article Ma and thus not moved among the passed articles (i.e., unmoved article number). In the operation content setting section 96A, the ratio of operation between the first robot 12A and the second robot 12B are set in advance. The information managing section 92A focuses the article M to be first moved in accordance with the next arrangement pattern P, and compares a predetermined ratio of operation with a ratio of the arrayed article number to a difference between the passed article number and the unmoved article number (i.e., passed article number −(minus) unmoved article number).

In this connection, provided that a single robot 12 completes an article arraying operation in accordance with a single arrangement pattern P, in a case where the first robot 12A does not move the focused article M to be first moved in accordance with the next arrangement pattern P, the article M to be moved after the focused article M in the article moving order determined by the arrangement pattern determining section 94 is also not moved by the first robot 12A. Thus, when executing the above comparison, the passed article number is prepared by adding the number of articles Mb to be moved in accordance with the next arrangement pattern P to the number of articles M actually passed through the working space of the first robot 12A. If the result of the comparison indicates that the ratio of the arrayed article number does not exceed the ratio of operation, the focused article M is selected as an article to be moved by the first robot 12A, and the first robot 12A performs the arraying operation until the article arraying in accordance with the arrangement pattern P is completed. On the other hand, the ratio of the arrayed article number exceeds the ratio of operation even if the first robot 12A does not move the focused article M, the focused article M is not selected as an article to be moved by the first robot 12A. When the first robot 12A completes the article arraying in accordance with the arrangement pattern P, the article M to be subsequently moved is focused, and the above-described comparison is performed with respect thereto.

For example, in a case where the ratio of operation between the first and second robots 12A and 12B is set to 1:0, the ratio of the arrayed article number to the difference between the passed article number and the unmoved article number is set to 1:1 as an internal operation (i.e., as a processing executed by the information managing section 92A), and consequently the first robot 12A performs the arraying operation to an operational efficiency limit thereof. On the other hand, the second robot 12B performs the arraying operation with respect to an article M exceeding the operational efficiency limit of the first robot 12A and an article M belonging the same arrangement pattern P as that for the exceeding article M and subsequent to the exceeding article M in the moving order. In a case where the ratio of operation between the first and second robots 12A and 12B is set to 1:1, the ratio of the arrayed article number to the difference between the passed article number and the unmoved article number is set to 2:1 as the internal operation, and consequently the first and second robots 12A and 12B perform the arraying operation at equal ratio.

In step S301, the information managing section 92A outputs to the operation executing section 98A, information of the selected article M together with information of the corresponding pattern element. The operation executing section 98A controls the first robot 12A to move the selected article M to the position of the corresponding pattern element. At a time when the movement of the article is completed, an operation completion flag is set as one of the information of the pattern element of the arrangement pattern P.

Figure 23:
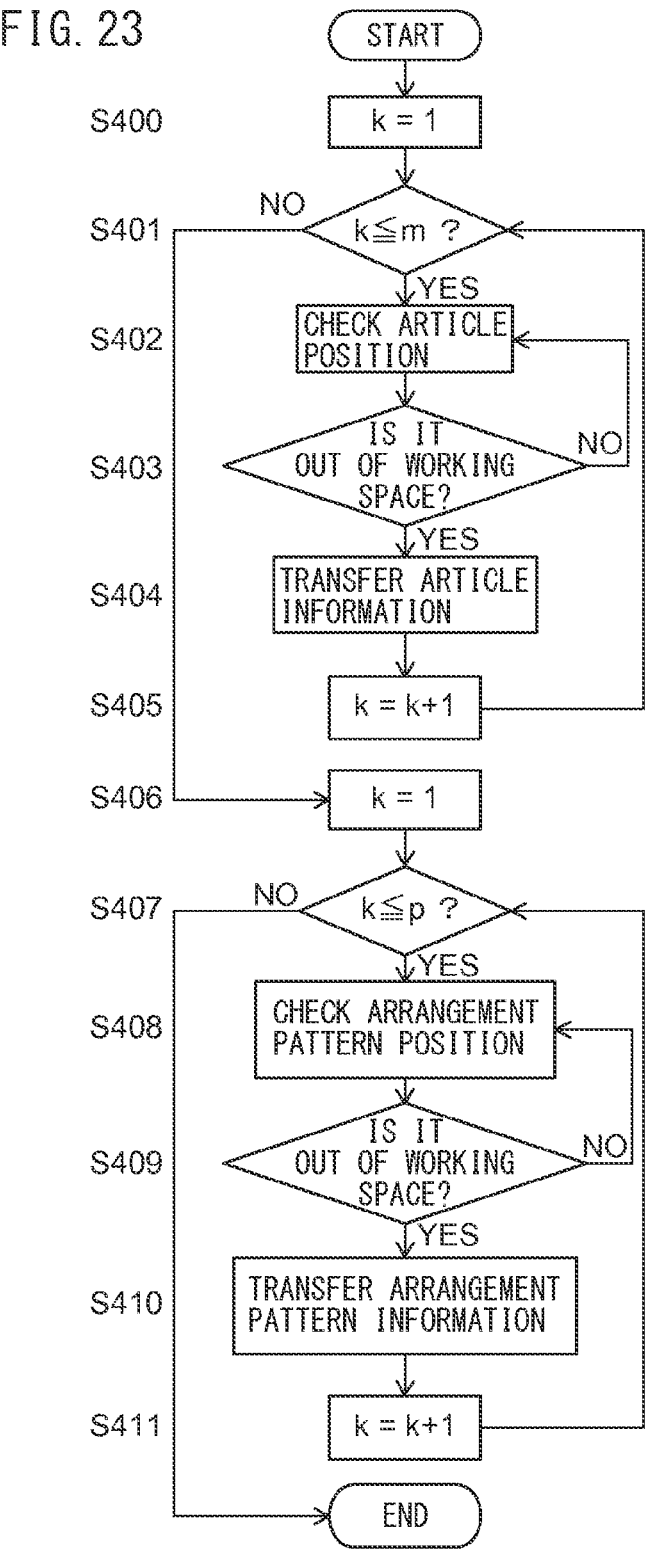
FIG. 23 is a flowchart of an arrangement pattern generating process executed in a control device.

FIG. 23 illustrates a flow of processing periodically executed by the information managing section 92A, separately from the processing illustrated in FIG. 22. In step S402, the information managing section 92A updates the current position of the article M, based on the difference between a detection value (or conveying information Dm) of the conveyer sensor 34 at an instant when the vision sensor 14 captures an image of the article M and a current detection value (or conveying information Dm) of the conveyer sensor 34. In a case where, in step S403, the current position of the article M is determined to be out of the predetermined working space of the first robot 12A, the information of the position or the position and orientation of the article M and the value of the conveyer sensor 34 at the instant of capturing are transferred, in step S404, from the information managing section 92A to the information managing section 92B of the second control device 40B. The above processes are sequentially executed for all of the articles M (the number thereof is "m") (steps S400, S401 and S405).

The information managing section 92A updates, in a similar way, the current position of each pattern element in the generated arrangement pattern P (step S408). In a case where, in step S409, the most upstream pattern element in the generated arrangement pattern P is determined to be out of the predetermined working space of the first robot 12A, the following information are transferred, in step S410, from the information managing section 92A to the information managing section 92B of the second control device 40B; i.e., the information of the positions or the positions and orientations of all of the pattern elements in the arrangement pattern P, the value of the conveyer sensor 34 at the instant of capturing the image of the reference article Ma in the arrangement pattern P, the article moving order determined for the pattern elements in the arrangement pattern P, information for associating each pattern element with an article M, and the operation completion flag. The above processes are sequentially executed for all of the arrangement patterns P (the number thereof is "p") (steps S406, S407 and S411). The information managing section 92B of the second control device 40B receives the above information from the information managing section 92A of the first control device 40A, and thereafter performs a processing corresponding to the processing performed by the information managing section 92A.

The article arraying device 30 having the above-described configuration provides an effect analogous to the aforementioned effect of the article arraying device 10, in a technical field wherein the robot 12 (or the first robot 12A and the second robot 12B) rearranges a plurality of articles M placed in a random arrangement on the conveyer 32 to a regular arrangement on the conveyer 32. The article arraying device 30 may have a configuration wherein the robot 12 (or the first robot 12A and the second robot 12B) operates while following the conveyance motion of the conveyer 32, and thereby it is possible to improve the efficiency of the arraying operation for the articles M without enlarging the working space of the robot 12 (or the first robot 12A and the second robot 12B). However, the present invention is not limited to this configuration, and the robot 12 (or the first robot 12A and the second robot 12B) may execute at least one of the picking motion and the arraying motion for the article M in the state where the conveyer 32 is stopped. It should be noted that each of the number of the robot 12 and the number of the corresponding control device 40 is not limited to two, but may be one or at least three.

Figure 24:
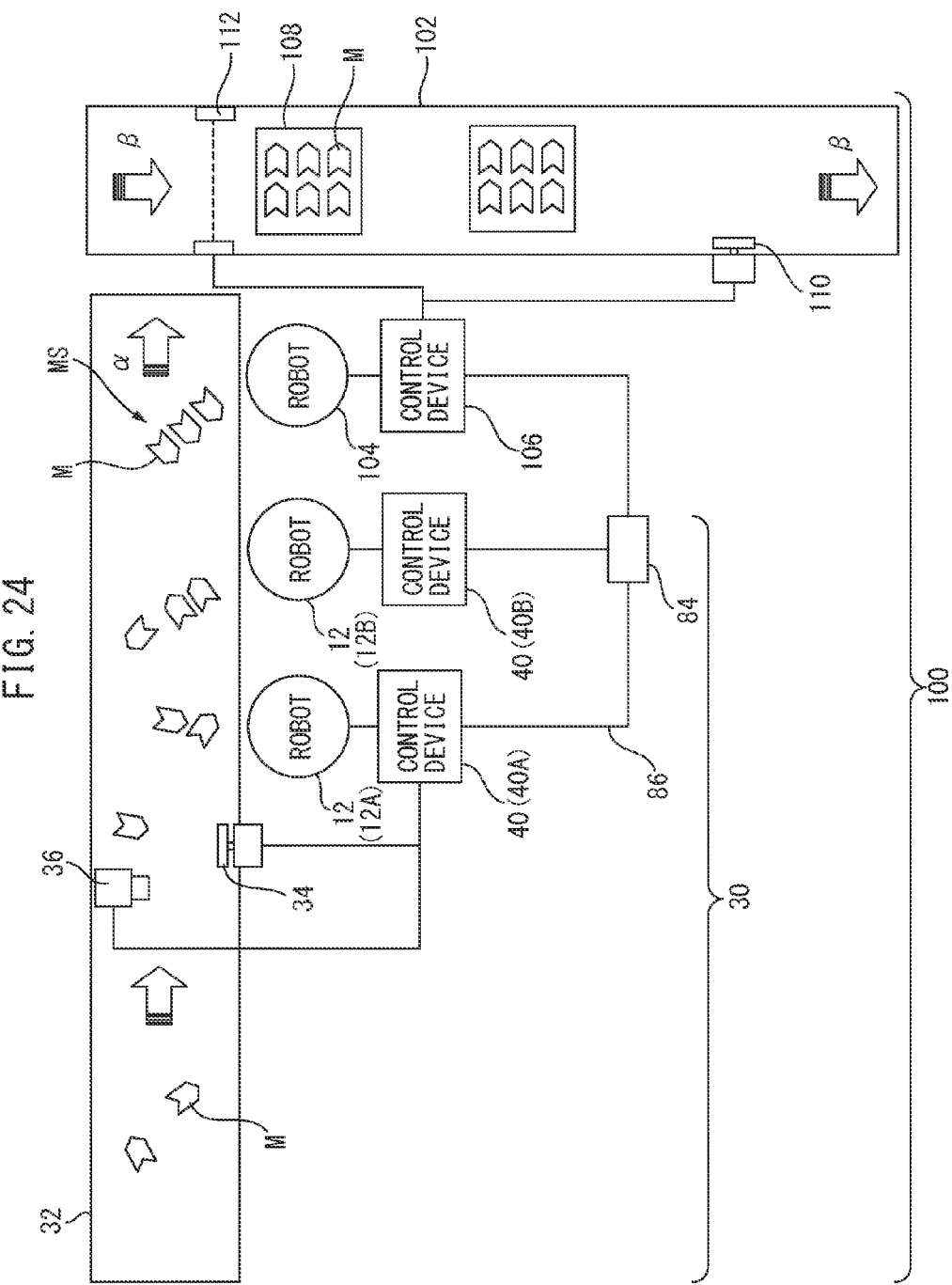
FIG. 24 is an illustration of an embodiment of an article transfer system according to another aspect.

FIG. 24 illustrates an embodiment of an article transfer system 100 according to another aspect of the present invention. The article transfer system 100 includes the article arraying device 30 described above. Components corresponding to the components of the article arraying device 30 are denoted by common reference numerals, and the detailed descriptions thereof are not repeated.

The article transfer system 100 includes the article arraying device 30; a conveying device 102 configured to convey a plurality of articles M in a regular arrangement in which the articles are juxtaposed to each other; and a transfer robot 104 configured to collectively hold a plurality of articles M arrayed in the regular arrangement by the article arraying device 30 and to transfer the articles M to the conveying device 102. The article transfer system 100 further includes a control device 106 configured to control the transfer robot 104. The control device 106 and the first and second control devices 40A and 40B are able to perform data communication with each other through the network hub 84 and the wired communication cable 86.

The conveying device 102 may be configured as a conveyor that includes a known convey member capable of supporting a tray 108, on which a plurality of article M arrayed in a regular arrangement are placed, and conveying the tray in one direction (a direction of an arrow β, in the drawing) and a known drive mechanism continuously or intermittently driving the convey member. In the illustrated embodiment, the article conveying direction β of the conveying device 102 is perpendicular to the article conveying direction α of the conveyer 32 of the article arraying device 30. The conveying device 102 is provided with a conveyer sensor (e.g., an encoder) 110 capable of detecting a position or a speed of the convey member or the drive mechanism. Conveying information of the conveying device 102, obtained by the conveyor sensor 110, is input to the control device 106. The control device 106 is able to communicate with the first and second control devices 40A and 40B and recognize a location on the conveyer 32 at which the articles M are arrayed by the first and second robot 12A and 12B. The control device 106 is also able to communicate with the first control device 40A and recognize the value of the conveyor sensor 34. The transfer robot 104 connected to the control device 106 operates based on the above information to collectively hold the article M arrayed on the conveyer 32 while following the conveyor 32. After holding the arrayed articles, the transfer robot 104 places the collectively held articles M on the tray 108 detected by, for example, a phototube sensor 112 provided for the conveying device 102 with use of the conveying information obtained by the conveyor sensor 110, while following the conveying device 102. In the illustrated example, six articles M are able to be placed on the tray 108, and the transfer robot 104 has a gripper (not illustrated) capable of holding six articles M. The gripper has a configuration capable of simultaneously and collectively holding three articles M. The transfer robot 104 holds two sets of three articles M (i.e., article sets MS) arrayed on the conveyer 32, and then places the article sets MS on the tray 108.

When the total number of articles M capable of being held by the transfer robot 104 is set to be equal to the positive integral multiple of the number of articles M arrayed in the regular arrangement, the transfer robot 104 is able to transfer at least one article set MS to the conveying device 102 by a single transfer motion, by performing holding motions repeated several times, the number of which is the same as the multiple number. However, the transfer robot 104 is not limited to the above configuration, but may be configured to be able to hold the articles M, the number of which is at least the number of articles M arrayed in the regular arrangement. For example, in a case where the transfer robot 104 is able to hold the articles M, the number of which corresponds to the number of arrayed articles M plus 1(one), the transfer robot 104 may perform a holding motion for collectively holding a single article set MS arrayed on the conveyer 32 and a holding motion for holding a single article M in another article set MS arrayed on the conveyer 32, and thereafter transfer the held articles M, the number of which corresponds to the arrayed number of articles M plus 1(one).

The control device 106 has a hardware configuration corresponding to the aforementioned hardware configuration (FIG. 10 or 11) of the control device 12. However, the control device 106 is not connected to the camera 36 and thus does not include the image processing section 44. The control device 106 is further connected to the phototube sensor 112 via an I/O interface 66, and thus is able to receive information from the phototube sensor 112.

Figure 25:
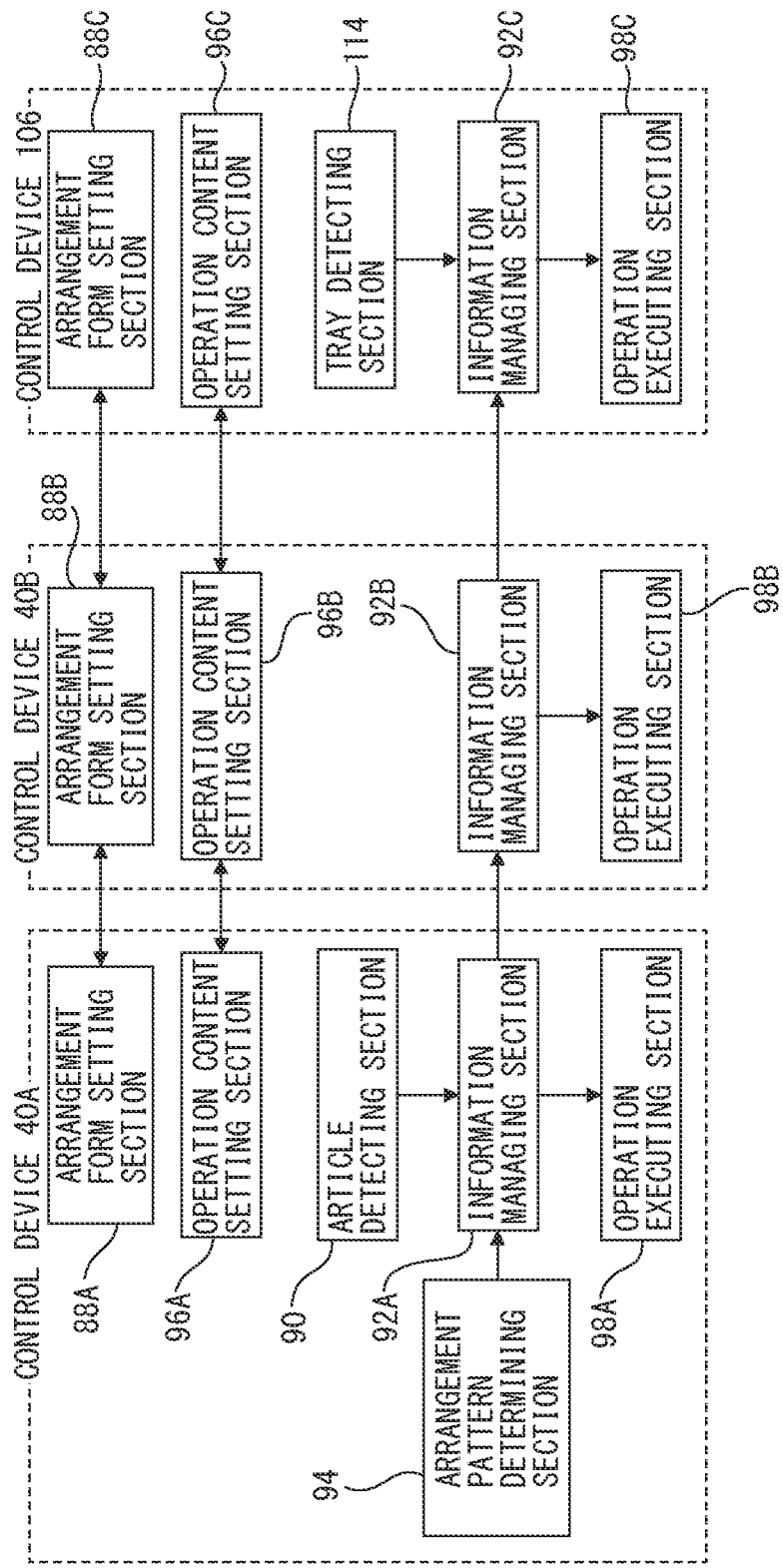
FIG. 25 is a functional block diagram of a control device in the embodiment of FIG. 24.

FIG. 25 is a functional block diagram illustrating processing units that address information related to the article M and the arrangement pattern P, in the first and second control devices 40A and 40B as well as the control device 106. Arrows in the drawing depict flows of the information relating to the article M, a tray on which the article M is placed, and the arrangement pattern P.

As illustrated in FIG. 25, the control device 106 includes an arrangement form setting section 88C, an information managing section 92C, an operation content setting section 96C and an operation executing section 98C, respectively corresponding to the arrangement form setting sections 88A and 88B, the information managing sections 92A and 92B, the operation content setting sections 96A and 96B and the operation executing sections 98A and 98B, of the first and second control devices 40A and 40B. The aforementioned arrangement form may be set in any one of the arrangement form setting sections 88A, 88B and 88C. The data of the pattern elements in the arrangement form defined in any of the arrangement form setting sections 88A, 88B and 88C may be transmitted to the other one(s) of the arrangement form setting sections 88A, 88B and 88C by communication, and thereby the pattern elements in the arrangement form is also defined in the other arrangement form setting section(s) 88A, 88B and 88C.

The control device 106 further includes a tray detecting section 114 configured to execute a detecting operation for the tray 108 on the conveying device 102. The transfer robot 104 performs a holding motion for sequentially holding two sets of arrayed articles M, and thereafter collectively places the held articles M on the tray 108 detected by the tray detecting section 114. The tray detecting section 114 is triggered by an input from the phototube sensor 112, so as to detect the tray 108. Once the tray 108 is detected, the tray detecting section 114 transfers to the information managing section 92C, information of a detected value of the conveyor sensor 110 of the conveying device 102 at the instant of detecting the tray 108. The information managing section 92C is configured to previously associate the position of the phototube sensor 112 or the moving direction of the conveying device 102 with the robot coordinate system of the transfer robot 104, and thereby is able to recognize the position of the tray 108 in the robot coordinate system with use of the value of the conveyor sensor 110 at the instant of the tray detection, received from the tray detecting section 114. The information managing section 92C is also able to obtain the value of the position or the position and orientation of the pattern element in the arrangement pattern P, from the information managing section 92B of the second control device 40B. The transfer robot 104 is able to execute the above-described collectively holding and transferring motions for the articles M with use of the aforementioned information.

The operation content, such as the number of sets of arrayed articles M, picked up from the conveyer 32 and placed on the tray 108 on the conveying device 102 by the transfer robot 104, may be previously set by the operation content setting section 96C. Alternatively, the operation content of the transfer robot 104 may be set by any one of the operation content setting sections 96A and 96B of the first and second control devices 40A and 40B and shared by the operation content setting sections 96A, 96B and 96C.

Figure 26:
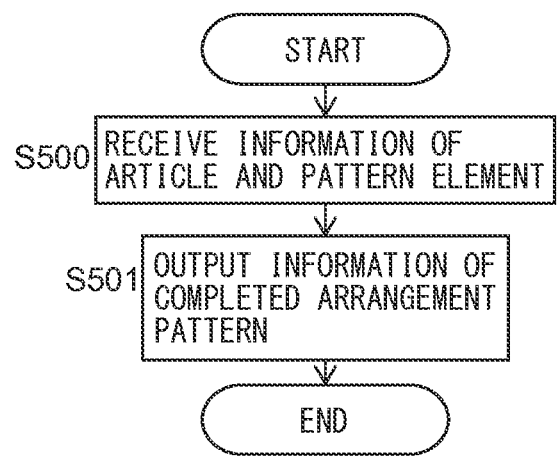
FIG. 26 is a flowchart of an article transfer process executed in a control device.

FIG. 26 illustrates a flow of processing performed at a time when the information managing section 92C of the control device 106 receives information from the information managing section 92B of the second control device 40B. In step S500, the information managing section 92C receives the following information from the information managing section 92B of the second control device 40B; i.e., the information of the position or the position and orientation of the article M, the value of the conveyor sensor 34 at the instant of capturing the image of the article, the information of the position or the position and orientation of each pattern element in the arrangement pattern P, the article moving order determined for the pattern elements in the arrangement pattern P, information for associating each pattern element with an article M, the value of the conveyor sensor 34 at the instant of capturing the image of the reference article Ma in the arrangement pattern P, and the operation completion flag. In step S501, the information managing section 92C transfers to the operation executing section 98C, information of the representative position or the representative position and orientation (of, e.g., the pattern element P1 in FIG. 3) of the completed arrangement pattern P, all of the pattern elements of which are provided with the operation completion flags. The operation executing section 98C executes the collective holding of the articles M arrayed in accordance with the completed arrangement pattern P, based on the information received from the information managing section 92C. In the operation content setting section 96C, the number of article sets MS to be sequentially and collectively held is designated in advance. The operation executing section 98C repeats the collective holding for the designated number of times. The transfer robot 104 collectively places the collectively held articles M on the tray 108 detected by the tray detecting section 114.

In the article transfer system 100 having the above-described configuration, it is possible for the transfer robot 104 to collectively hold the predetermined number (defined by the arrangement form) of articles M arrayed in the regular arrangement on the conveyor 32 by the article arraying device 30, and transfer them to the conveying device 102 in the form of the arrayed article set MS. In a system configuration where the conveying device 102 is required to convey a plurality of articles M juxtaposed to each other in the regular arrangement, the transfer robot 104 does not need to have a function for arraying the articles M, and therefore it is possible to improve efficiency in the transferring operation. The transfer robot 104 may have a general-purpose configuration, as long as a gripper capable of collectively holding a predetermined number of arrayed articles M is attachable to the transfer robot 104.

On the other hand, the first and second robots 12A and 12B provided in the article transfer system 100 have a configuration for exclusively performing the aforementioned article arraying operation, and do not need to have a function for transferring the articles M arrayed in the regular arrangement to the conveying device 102. Accordingly, it is possible to restrict the working spaces of the first and second robots 12A and 12B to working spaces solely for the article arraying operation, and thus to use a downsized robot for each of the first and second robots 12A and 12B, compared to the transfer robot 104.

The article transfer system 100 includes the robot 12 (the first and second robots 12A and 12B) provided exclusively for the article arraying and the transfer robot 104 provided exclusively for the article transferring, so that it is possible to freely design the relative disposition of the conveyor 32 and the conveying device 102. For example, in a system configuration where a plurality of robots share in performing the article transferring operation from the conveyor 32 to the conveying device 102, it is preferable to dispose the conveyor 32 and the conveying device 102 in parallel and to ensure the robots to perform the article transferring operation therebetween. Contrary to this, in the article transfer system 100, it is possible for the transfer robot 104 to smoothly perform the article transferring operation despite the fact that the conveyor 32 and the conveying device 102 have a relative disposition for conveying the articles in the directions perpendicular to each other as illustrated.

The transfer robot 104 is configured to operate to follow the conveying motion of each of the conveyor 32 and the conveying device 102, so that it is possible to improve the efficiency in the transferring operation for articles M without enlarging the working space of the transfer robot 104. However, the transfer robot 104 is not limited to the above configuration, but may be configured to execute the transferring operation for the articles M in a state where the conveyor 32 or the conveying device 102 is stopped. The article transfer system 100 may include an article arraying device including no conveyer, instead of the article arraying device 30 including the conveyer 32. It should be noted that each of the number of the transfer robot 104 and the number of the corresponding control device 106 is not limited to one, but may be at least two.

Thus, according to the article transfer system 100, it is possible to reduce a cost for establishing the system, due to the generalization of the transfer robot 104 and the downsizing of the article arraying robot 12, and to increase the degree of freedom in designing the relative disposition of system components such as a conveyor or a robot.

Figure 27:
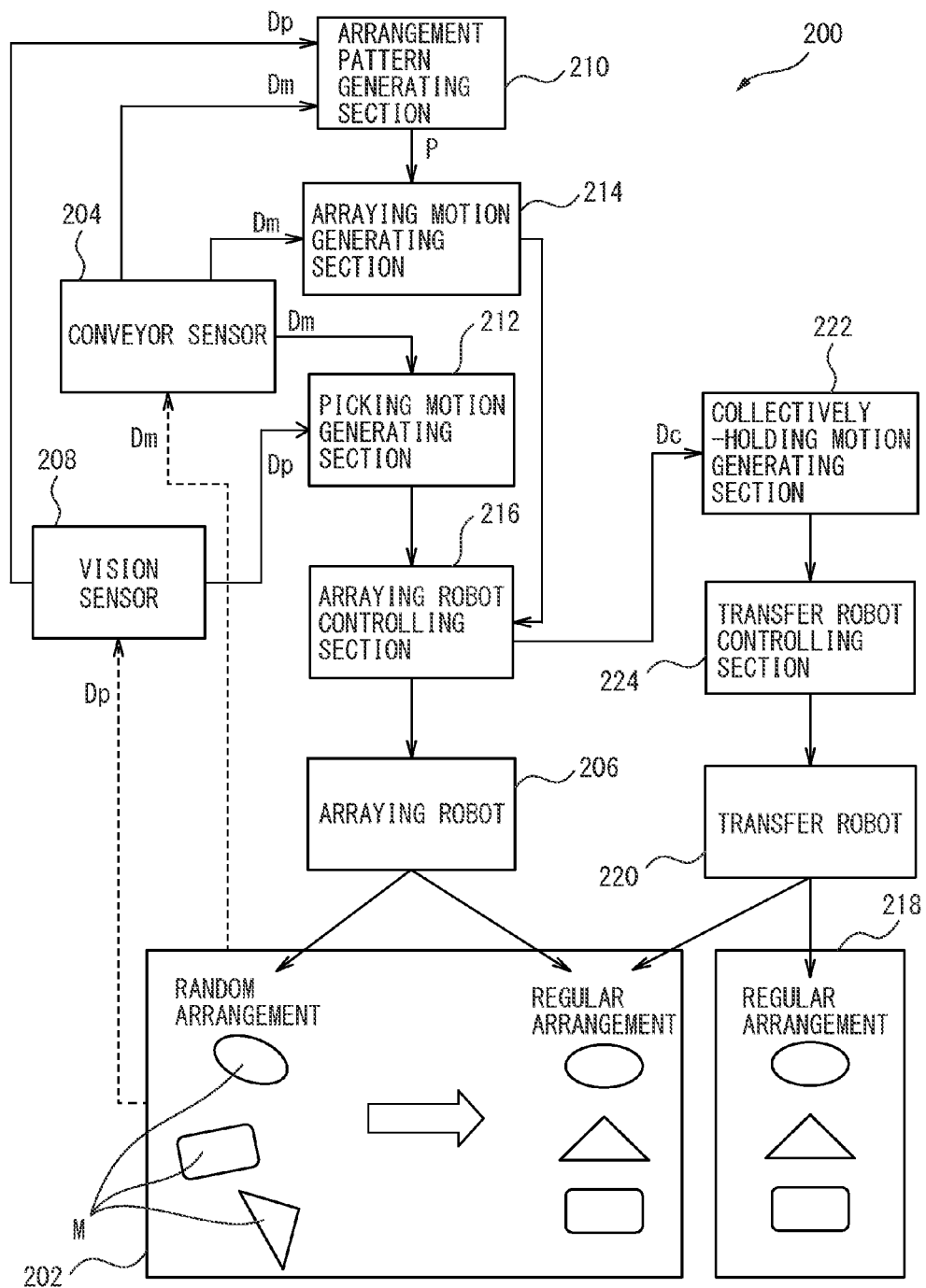
FIG. 27 is a functional block diagram illustrating a configuration of an article transfer system according to a further aspect.

The above characteristic effects provided by the article transfer system 100 are also provided in a system configuration that includes an article arraying device performing a general article arraying operation, in place of the article arraying device 30. The article arraying device performing the general article arraying operation may have a configuration wherein, for example, the article arraying operation is performed with respect to a regular arrangement pattern P that corresponds to the alternative arrangement pattern PA in the free space S as shown in FIGS. 19 and 20. In this article arraying operation, it is not necessary to selectively determine the reference article Ma, and all of the plurality of articles M placed on the conveyor 32 in the random arrangement are sequentially moved to the free space S, and are rearranged to the regular arrangement in accordance with the regular arrangement pattern P. One embodiment of the generalized article arraying device may have a following configuration as shown in FIG. 27.

More specifically, an article transfer system 200 configured to array a plurality of articles M so as to rearrange the articles from a random arrangement to a regular arrangement and thereafter transfer the arrayed articles, comprising:

a conveyor 202 configured to convey an article M;

a conveyor sensor 204 configured to obtain conveying information Dm of the conveyor 202;

an arraying robot 206 configured to rearrange a plurality of articles M placed on the conveyor 202 in a random arrangement so as to array the articles on the conveyor 202;

a vision sensor 208 configured to obtain position information Dp of each of the plurality of articles M placed on the conveyor 202 in the random arrangement;

an arrangement pattern generating section 210 configured to generate an arrangement pattern P on the conveyor 202 with use of the position information Dp and the conveying information Dm, the arrangement pattern P including a plurality of pattern elements in a predetermined regular arrangement, each pattern element representing a position of an article;

a picking motion generating section 212 configured to generate a picking motion of the arraying robot 206 with use of the position information Dp and the conveying information Dm, the arraying robot 206 being configured to pick up, by the picking motion, an article M from the conveyor 202;

an arraying motion generating section 214 configured to generate an arraying motion of the arraying robot 206 with use of the conveying information Dm, the arraying robot 206 being configured to place, by the arraying motion, the article picked up from the conveyor 202 by the picking motion in a position on the conveyor 202 in accordance with the arrangement pattern P;

an arraying robot controlling section 216 configured to control the picking motion and the arraying motion of the arraying robot 206;

a conveying device 218 configured to convey a plurality of articles M in a regular arrangement in which the articles M are juxtaposed to each other;

a transfer robot 220 configured to collectively hold a plurality of articles M arrayed on the conveyor 202 in the regular arrangement by the arraying robot 206 and to transfer the articles M to the conveying device 218;

a collectively-holding motion generating section 222 (corresponding to the operation content setting section 96C depicted in FIG. 25) configured to generate a collectively-holding motion of the transfer robot 220 with use of an arraying-motion control information Dc obtained from the arraying robot controlling section 216, the transfer robot 220 being configured to collectively hold, by the collectively-holding motion, the articles M and pick up them from the conveyor 202; and a transfer robot controlling section 224 configured to control the collectively-holding motion of the transfer robot 206.

Figure 28:
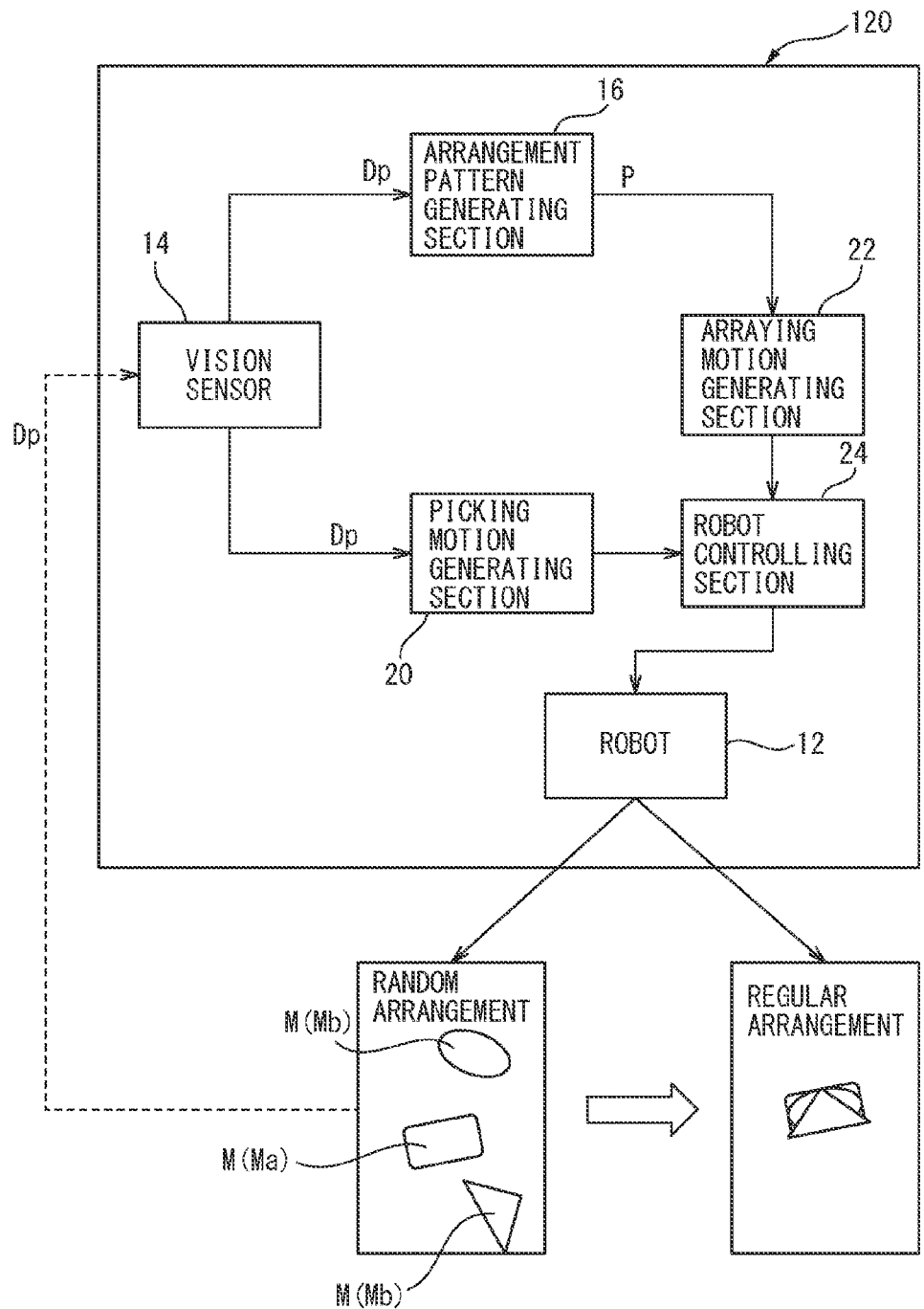
FIG. 28 is a functional block diagram illustrating a configuration of an article arraying device according to yet another aspect.

FIG. 28 is a functional block diagram illustrating a configuration of an article arraying device 120 according to another embodiment of the present invention. The article arraying device 120 is configured to array a plurality of articles M by a robot 12, so as to rearrange the articles from a random arrangement to a regular arrangement. Specifically, the article arraying device 120 is configured to be capable of arraying a plurality of articles M in a three-dimensional regular arrangement in which the articles M are placed one on top of the other, instead of the two dimensional regular arrangement achieved by the aforementioned article arraying device 10. To this end, the article arraying device 120 does not include the interference judging section 18. The article arraying device 120 has substantially the same configuration as the article arraying device 10, except that the interference judging section 18 is not provided. Components corresponding to the components of the article arraying device 10 are denoted with the same reference numerals and the detailed descriptions thereof are not repeated below.

The article arraying device 120 includes a robot 12 configured to hold an article M; a vision sensor 14 configured to obtain position information Dp of each of a plurality of articles M placed in a random arrangement; an arrangement pattern generating section 16 configured to generate, in a virtual manner, an arrangement pattern P with use of position information Dp, the arrangement pattern P including a plurality of pattern elements in a predetermined regular arrangement, each pattern element representing a position of an article M, in such a manner that a first pattern element that is any one of the plurality of pattern elements coincides with a position of a reference article Ma that is any one of the plurality of articles M placed in the random arrangement; a picking motion generating section 20 configured to generate a picking motion of the robot 12 with use of the position information Dp, the robot 12 being configured to pick up, by the picking motion, an article Mb other than the reference article Ma; an arraying motion generating section 22 configured to generate an arraying motion of the robot 12, the robot 12 being configured to place, by the arraying motion, the article Mb picked up by the picking motion in a position juxtaposed to the reference article Ma in accordance with the arrangement pattern P; and a robot controlling section 24 configured to control the picking motion and the arraying motion of the robot 12.

The article M may be variously shaped and dimensioned. The articles M having various shapes and sizes, or the articles M having the same shape and size, may be placed in the random arrangement. The "random arrangement" means an arrangement where the articles M are randomly arranged and not intended to be arranged in a certain form. More specifically, the random arrangement means that, in a two-dimensional extent (e.g., in an image obtained by the vision sensor 14) defined when viewing the plurality of articles M from directly above, the respective articles M take various positions and orientations. On the contrary, the "regular arrangement" achieved by the article arraying device 120 means an arrangement wherein the plurality of articles M are disposed one on top of the other under a certain rule in the third dimension (i.e., in a height direction) relative to the aforementioned two dimensional extent. In the regular arrangement, the orientations (or the directions) of the respective articles M may be identical to or different from each other.

The arrangement pattern generating section 16 of the article arraying device 120 is able to generate the arrangement pattern P based on an arrangement form, the arrangement form being configured to define each of the plurality of pattern elements by a coordinate value in a predetermined pattern coordinate system, in the same manner as the arrangement pattern generating section 16 of the article arraying device 10. The robot 12 operates in accordance with the generated arrangement pattern P so as to rearrange the plurality of articles M from the random arrangement to the regular arrangement in which the articles M are placed one on top of the other,. In the article arraying device 120, any one of the plurality of articles M placed in the random arrangement is set as the reference article Ma (FIG. 28), and the robot 12 operates so as not to move the reference article Ma but to place the other article Mb (FIG. 28) in a position juxtaposed to and on top of the reference article Ma.

FIGS. 29A to 29C schematically illustrates an example of the arrangement pattern P generated by the arrangement pattern generating section 16 of the article arraying device 120. The arrangement pattern P illustrated in FIGS. 29A-29C has a configuration to make the robot 12 operate to array three articles M in a three-tiered form to take the identical orientation. As illustrated in FIG. 29A, the arrangement form used for generating the arrangement pattern P has a configuration wherein, in a three dimensional pattern coordinate system 26', pattern elements P1, P2 and P3 are respectively defined by coordinate values (0, 0, 0), (0, 0, Z1) and (0, 0, Z2), and a relative rotation angle R (0°, 0°, 0°). FIG. 29B illustrates the arrangement pattern P including the pattern elements P1, P2 and P3 thus defined, together with the coordinate axes X and Y of the pattern coordinate system 26'. FIG. 29C also illustrates the arrangement pattern P including the pattern elements P1, P2 and P3 thus defined, together with the coordinate axes X and Z of the pattern coordinate system 26'. The robot 12 operates to rearrange the three articles M placed in the random arrangement to a regular arrangement, in accordance with the arrangement pattern P of FIGS. 29B and 29C, in which the articles M are concentrically stacked one on top of the other in the identical orientation, as illustrated in FIGS. 29B and 29C. In the illustrated example, the three articles M are placed in the regular arrangement by positioning or aligning the geometrical centers of the two dimensional outer shapes (circles) of the articles M at the pattern elements P1, P2 and P3.

The article arraying device 120 may be configured not to consider the orientation of each article M when the articles M are arrayed in the regular arrangement. In this configuration, the arrangement pattern P generated by the arrangement pattern generating section 16 has no relative rotation angle R set for each pattern element in the arrangement form.

In the example illustrated in FIGS. 29A-29C, a first pattern element that is any one of the plurality of pattern elements defined by the arrangement form is set to coincide with the position (or the position and orientation, in a case where the relative rotation angle R of the pattern element is designated) of the reference article Ma that is any one of the plurality of articles M placed in the random arrangement, so that the other second pattern elements defined by the arrangement form are arrayed in the regular arrangement (i.e., the stacked form) with respect to the first pattern element, and thereby the arrangement pattern P is generated. The robot 12 places the other articles Mb so as to coincide with the second pattern elements, in accordance with the arrangement pattern P. In this manner, the plurality of articles M are arrayed in the regular arrangement (i.e., the stacked form) in accordance with the arrangement pattern P.

The pattern coordinate system 26' used in the arrangement form may be set at any position and in any orientation. The coordinate value (X, Y, Z) and the relative rotation angle R, defining each pattern element, are defined correspondingly to the position and orientation of the pattern coordinate system 26'. In the article arraying device 120, the arrangement pattern P is generated on the site where the plurality of articles M are to be arrayed in the regular arrangement as described above, on the basis of the reference article Ma that has already been placed, and thereby the position and orientation of the pattern coordinate system of the arrangement pattern P at the site are obtained. The pattern coordinate system 26' used in the arrangement form is converted into the pattern coordinate system of the generated arrangement pattern P, and thereby an actual position or a position in a robot coordinated system (or position and the orientation, in a case where the relative rotation angle R is designated) of the pattern element on the site (i.e., the article M) is determined.

In the article arraying device 120, the arrangement pattern generating section 16 may suitably select any of the plurality of articles M placed in the random arrangement as the reference article Ma without considering the interference between the articles M, when generating the arrangement pattern P on site. In the article arraying device 120, the picking motion generating section 20 may generate the picking motion so as to make the robot 12 suitably select and pick up any article Mb other than the reference article M among the plurality of articles M placed in the random arrangement, without considering the interference between the articles M. In the article arraying device 120, the arraying motion generating section 22 may generate the arraying motion so as to make the robot 12 stack the picked up articles Mb on top of the reference article Ma in a suitable order, without considering the interference between the articles M. In the article arraying device 120, the robot controlling section 24 controls the picking motion generated by the picking motion generating section 20 and the arraying motion generated by the arraying motion generating section 22, and thereby makes the robot 12 appropriately operate, so that it is possible to efficiently array the plurality of articles M, including the reference article Ma, in the regular arrangement.

In the article arraying device 120 having the above configuration, the arrangement pattern P is generated on site by considering any one of the plurality of articles M placed in the random arrangement, as the reference article Ma, and the robot 12 operates to place the other article Mb in a position juxtaposed to the reference article Ma in accordance with the arrangement pattern P, without moving the reference article Ma, and thereby it is possible to array the articles M in the regular arrangement. Therefore, regarding an operation for rearranging a single article M from the random arrangement to the regular arrangement as a unit operation, it is possible to array the articles M, the number of which is one more than the number of unit operations, so that it is possible to improve the efficiency in the arraying operation as an assemblage of the unit operations. Also, it is possible to use a general-purpose mechanism as the robot 12 and an end effector such as a gripper, as long as it can perform the picking motion and the arraying motion while holding the article M.

The configuration of the above article arraying device 120 may be described as an article arraying method according to another aspect of the present invention. The article arraying method has a configuration for making a robot 12 array a plurality of articles M so as to rearrange the articles from a random arrangement to a regular arrangement, and includes the steps of: obtaining position information Dp of each of a plurality of articles M placed in a random arrangement; generating a virtual arrangement pattern P with use of the position information Dp, the arrangement pattern P including a plurality of pattern elements in a predetermined regular arrangement, each pattern element representing a position of an article M, in such a manner that a first pattern element that is any one of the plurality of pattern elements coincides with a position of a reference article Ma that is any one of the plurality of articles M placed in the random arrangement; generating a picking motion of the robot 12 with use of the position information Dp, the robot 12 being configured to pick up, by the picking motion, an article M other than the reference article Ma; generating an arraying motion of the robot 12, the robot 12 being configured to place, by the arraying motion, the article Mb picked up by the picking motion in a position juxtaposed to the reference article Ma in accordance with the arrangement pattern P; and controlling the picking motion and the arraying motion of the robot 12, so as to array the plurality of articles M including the reference article Ma in a regular arrangement.

The article arraying device 30 illustrated in FIG. 9 may include the basic configuration of the article arraying device 120, instead of the basic configuration of the article arraying device 10. In this case, the control device 40 (the first and second control devices 40A and 40B) may have a hardware configuration corresponding to the hardware configurations illustrated in FIGS. 10 and 11, and have functions corresponding to those depicted in the functional block diagram of FIG. 12 except for the function of the interference judging section 18. In the article arraying device 30 having the basic configuration of the article arraying device 120, the first and second robots 12A and 12B, operating independently from each other, rearranges a plurality of articles M placed in a random arrangement on the conveyer 32 to a regular arrangement in which the articles M are stacked on top of the other on the conveyer 32.

The article transfer system 100 illustrated in FIG. 24 may include the article arraying device 30 having the basic configuration of the article arraying device 120. In this article transfer system 100, the transfer robot 104 collectively holds a predetermined number (defined in the arrangement form) of articles M arrayed in a regular arrangement by the article arraying device 30 so as to be stacked on top of the other on the conveyer 32, and transfers them as the set of stacked articles to the conveying device 102.

While the invention has been described with reference to specific embodiments, it will be understood, by those skilled in the art, that various changes or modifications may be made thereto without departing from the scope of the following claims. For example, the number of robots and the control devices for the robots in the article arraying device and the number of transfer robots and the control devices for the transfer robots are not limited to those in the embodiments.

The invention claimed is:

1. An article arraying device configured to array a plurality of articles so as to rearrange the articles from a random arrangement to a regular arrangement, comprising:
    a robot configured to hold an article;
    a vision sensor configured to obtain position information of each of a plurality of articles placed in a random arrangement;
    an arrangement pattern generating section configured to generate an arrangement pattern with use of the position information, the arrangement pattern including a plurality of pattern elements in a predetermined regular arrangement, each pattern element representing a position of an article, in such a manner that a first pattern element that is any one of the plurality of pattern elements coincides with a position of a reference article that is any one of the plurality of articles placed in the random arrangement;
    a picking motion generating section configured to generate a picking motion of the robot with use of the position information, the robot being configured to pick up, by the picking motion, an article other than the reference article;
    an arraying motion generating section configured to generate an arraying motion of the robot, the robot being configured to place, by the arraying motion, the article picked up by the picking motion in a position juxtaposed to the reference article in accordance with the arrangement pattern; and
    a robot controlling section configured to control the picking motion and the arraying motion of the robot.

2. The article arraying device of claim 1, wherein the robot includes a first mechanical section and a second mechanical section, configured to operate independently from each other; and wherein the robot controlling section is configured to control the first mechanical section to execute the picking motion and the arraying motion and also control the second mechanical section to execute the picking motion and the arraying motion, in accordance with a predetermined ratio of operation.

3. An article transfer system, comprising:
    the article arraying device of claim 1;
    a conveying device configured to convey a plurality of articles in a regular arrangement in which the articles are juxtaposed to each other; and
    a transfer robot configured to collectively hold a plurality of articles arrayed in the regular arrangement by the article arraying device and to transfer the articles to the conveying device.

4. The article arraying device of claim 1, further comprising:
    a conveyor configured to convey the article; and
    a conveyor sensor configured to obtain conveying information of the conveyor;
    wherein the vision sensor is configured to obtain the position information of the plurality of articles placed on the conveyor in the random arrangement;
    wherein the arrangement pattern generating section is configured to generate the arrangement pattern on the conveyor, the reference article being one of the plurality of articles placed on the conveyor in the random arrangement;
    wherein the picking motion generating section is configured to generate the picking motion with use of the conveying information and the position information, the robot being configured to pick up, by the picking motion, the article other than the reference article from the conveyor; and
    wherein the arraying motion generating section is configured to generate the arraying motion with use of the conveying information, the robot being configured to place, by the arraying motion, the article picked up from the conveyor in the position on the conveyor in accordance with the arrangement pattern.

5. The article arraying device of claim 4, wherein the robot controlling section is configured to control the picking motion and the arraying motion so as to follow a conveying motion of the conveyor.

6. The article arraying device of claim 1, further comprising:
    an interference judging section configured to predictively judge as to whether an interference is caused between an article capable of being placed on a second pattern element in the arrangement pattern, different from the first pattern element, and another article including the reference article, with use of shape information of each of the plurality of articles together with the position information;
    wherein the picking motion generating section is configured to generate the picking motion in consideration of a judgment of the interference judging section; and wherein the arraying motion generating section is configured to generate the arraying motion in consideration of a judgment of the interference judging section.

7. The article arraying device of claim 6, wherein the interference judging section is configured to predictively judge as to whether the article capable of being placed on the second pattern element protrudes from a predetermined working space.

8. The article arraying device of claim 6, wherein, when the interference judging section judges that the interference is caused, the picking motion generating section generates the picking motion so as to make the robot pick up an article causing the interference, from among the plurality of articles placed in the random arrangement, prior to picking up an article causing no interference, from among the plurality of articles placed in the random arrangement.

9. The article arraying device of claim 6, wherein the arrangement pattern generating section is configured to determine the reference article by selecting any one of the plurality of articles placed in the random arrangement in consideration of the judgment of the interference judging section.

10. The article arraying device of claim 6, wherein, when it is predicted, as a result of considering the judgment of the interference judging section, that the robot cannot place an article in a position juxtaposed to the reference article in accordance with the arrangement pattern,
the picking motion generating section generates an exceptional picking motion of the robot with use of the position information, the robot being configured to pick up, by the exceptional picking motion, a plurality of articles including the reference article,
the arrangement pattern generating section generates an alternative arrangement pattern including a plurality of alternative pattern elements respectively corresponding to the plurality of pattern elements, in a free space where it is predicted that no interference is caused between a plurality of articles capable of being placed on the plurality of alternative pattern elements and another article, and
the arraying motion generating section generates an exceptional arraying motion of the robot, the robot being configured to place, by the exceptional arraying motion, the plurality of articles picked up by the exceptional picking motion in positions juxtaposed to each other in the free space in accordance with the alternative arrangement pattern.

11. The article arraying device of claim 1, wherein the arrangement pattern generating section is configured to generate the arrangement pattern based on an arrangement form, the arrangement form being configured to define each of the plurality of pattern elements by a coordinate value in a predetermined pattern coordinate system.

12. The article arraying device of claim 11, wherein each of the plurality of pattern elements further represents an orientation of each of the plurality of articles; and wherein the arrangement form is configured to define each of the plurality of pattern elements by the coordinate value and a relative rotation angle in the pattern coordinate system.

13. An article arraying method for making a robot array a plurality of articles so as to rearrange the articles from a random arrangement to a regular arrangement, comprising:
obtaining position information of each of a plurality of articles placed in a random arrangement;
generating an arrangement pattern with use of the position information, the arrangement pattern including a plurality of pattern elements in a predetermined regular arrangement, each pattern element representing a position of an article, in such a manner that a first pattern element that is any one of the plurality of pattern elements coincides with a position of a reference article that is any one of the plurality of articles placed in the random arrangement;
generating a picking motion of the robot with use of the position information, the robot being configured to pick up, by the picking motion, an article other than the reference article;
generating an arraying motion of the robot, the robot being configured to place, by the arraying motion, the article picked up by the picking motion in a position juxtaposed to the reference article in accordance with the arrangement pattern; and
controlling the picking motion and the arraying motion of the robot, so as to array the plurality of articles including the reference article in a regular arrangement.

14. The article arraying method of claim 13, which makes the robot individually pick up the plurality of articles placed on a conveyor in the random arrangement, and array the articles on the conveyor in the regular arrangement while following a conveying motion of the conveyor.

15. The article arraying method of claim 13, further comprising:
predictively judging as to whether an interference is caused between an article capable of being placed on a second pattern element in the arrangement pattern, different from the first pattern element, and another article including the reference article, with use of shape information of each of the plurality of articles together with the position information;
wherein the picking motion is generated in consideration of a judgment of the interference; and
wherein the arraying motion is generated in consideration of a judgment of the interference.

* * * * *